US012496776B2

(12) United States Patent
Taylor et al.

(10) Patent No.: US 12,496,776 B2
(45) Date of Patent: Dec. 16, 2025

(54) FUSED FILAMENT FABRICATION PRINT HEAD SYSTEM

(71) Applicant: Board of Regents, The University of Texas System, Austin, TX (US)

(72) Inventors: Robert Taylor, Fort Worth, TX (US); Rhugdhrivya Rane, Arlington, TX (US); Manjarik Mrinal, Arlington, TX (US); Parimal Thakorbhai Patel, Austin, TX (US); Tanvir Ahmed Shanto, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 236 days.

(21) Appl. No.: 18/360,150

(22) Filed: Jul. 27, 2023

(65) Prior Publication Data

US 2024/0051223 A1  Feb. 15, 2024

Related U.S. Application Data

(60) Provisional application No. 63/370,831, filed on Aug. 9, 2022.

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 64/386* (2017.08);
(Continued)

(58) Field of Classification Search
None
See application file for complete search history.

(56) References Cited

U.S. PATENT DOCUMENTS

2016/0031159 A1* 2/2016 Church ................. B29C 48/872
425/375
2016/0046081 A1* 2/2016 Kim ...................... B29C 64/118
425/143

(Continued)

OTHER PUBLICATIONS

Ahn, S.H.; Montero, M.; Odell, D.; Roundy, S.; Wright, P.K. Anisotropic material properties of fused deposition modeling ABS. Rapid Prototyp. J. 2002, 8, 248-257.

(Continued)

*Primary Examiner* — Yung-Sheng M Tsui
(74) *Attorney, Agent, or Firm* — Meunier Carlin & Curfman LLC

(57) ABSTRACT

Various implementations include a fused filament fabrication print head system that includes a nozzle, a heating block, and a cooling element. The nozzle defines a nozzle opening and a filament flow path and is configured to deposit a filament through the nozzle opening. The heating block is coupled to the nozzle such that the filament flow path extends through the heating block. The heating block includes a heating element. The cooling element is spaced apart from the heating block along the filament flow path and is configured to provide localized cooling to a portion of the filament at a location along the filament flow path prior to the heating block. The localized cooling provided by the cooling element preserves the stiffness of the filament and ensures sufficient back pressure to push the filament through the heating block and nozzle opening.

14 Claims, 25 Drawing Sheets

(51) Int. Cl.
  *B29C 64/386* (2017.01)
  *B33Y 30/00* (2015.01)
  *B33Y 50/00* (2015.01)
  *B29K 67/00* (2006.01)
(52) U.S. Cl.
  CPC .............. *B33Y 30/00* (2014.12); *B33Y 50/00* (2014.12); *B29K 2067/046* (2013.01)

(56) References Cited

U.S. PATENT DOCUMENTS

| | | | |
|---|---|---|---|
| 2016/0185042 A1* | 6/2016 | Toh | B29C 64/106 |
| | | | 425/132 |
| 2018/0015659 A1* | 1/2018 | Cheng | B29C 64/386 |
| 2018/0236713 A1* | 8/2018 | Robert | B33Y 40/00 |
| 2018/0290365 A1* | 10/2018 | Noorazar | B29C 48/92 |
| 2019/0016048 A1* | 1/2019 | Parietti | A61K 9/4808 |
| 2020/0039140 A1* | 2/2020 | You | B29C 64/245 |
| 2022/0402213 A1* | 12/2022 | Watanabe | B29C 64/236 |

OTHER PUBLICATIONS

ASTM D638-22. Standard Test Method for Tensile Properties of Plastics https://www.astm.org/Standards/D638.htm, last accessed Aug. 2020.
Bellini, A.; Güçeri, S. Mechanical characterization of parts fabricated using fused deposition modeling. Rapid Prototyp. J. 2003, 9, 252-264.
Bromberger, J.; Kelly, R. Additive manufacturing: A long-term game changer for manufacturers. In The Great Re-Make: Manufacturing for Modern Times; Backwell, E., Gambell, T., Marya, V., Schmitz, C., Eds.; Mckinsey & Company: New York, NY, USA, 2017; pp. 59-66.
C. Sweeney, B. Lackey, M. Pospisil, T. Achee, V. Hicks, A. Moran, B. Teipel, M. Saed, M. Green, Welding of 3D-printed carbon nanotube-polymer composites by locally induced microwave heating, Sci. Adv. 6 (2017) 1-6.
Cole, D.P.; Riddick, J.C.; Iftekhar Jaim, H.M.; Strawhecker, K.E.; Zander, N.E. Interfacial mechanical behavior of 3D printed Abs. J. Appl. Polym. Sci. 2016, 133.
Costa, F.M. Duarte, J.A. Covas, Estimation of filament temperature and adhesion development in fused deposition techniques, J. Mater. Process. Technol. 245 (2017) 167-1.
Darshan Ravoori, Hardikkumar Prajapati, Viswajit Talluru, Ashfaq Adnan, Ankur Jain, Nozzle-integrated pre-deposition and post-deposition heating of previously deposited layers in polymer extrusion based additive manufacturing, Additive Manufacturing, vol. 28, 2019, pp. 719-726, ISSN 2214-8604, https://doi.org/10.1016/j.addma.2019.06.006.
Dimitrov, K. Schreve, N. de Beer, Advances in three dimensional printing—state of the art and future perspectives, Rapid Prototyping J. 12 (2006) 136-147.
Domingo-Espin, M.; Travieso-Rodriguez, J.A.; Jerez-Mesa, R.; Lluma-Fuentes, J. Fatigue performance of ABS specimens obtained by fused filament fabrication. Materials 2018, 11, 2521.
Duty, C. Ajinjeru, V. Kishore, B. Compton, N. Hmeidat, X. Chen, P. Liu, A. Hassen, J. Lindahl, V. Kunc, What makes a material printable? A viscoelastic model for extrusion-based 3D printing of polymers, J. Korean Soc. Manuf. Process. Eng. 35 (2018) 526-537.
Puigoriol-Forcada, Josep M., et al. "Flexural fatigue properties of polycarbonate fused-deposition modelling specimens." Materials & Design 155 (2018): 414-421.
Gomez-Gras, G.; Jerez-Mesa, R.; Travieso-Rodriguez, J.A.; Lluma-Fuentes, J. Fatigue performance of fused filament fabrication PLA specimens. Mater. Des. 2018, 140, 278-285.
Kruth, J.-P.; Leu, M.C.; Nakagawa, T. Progress in additive manufacturing and rapid prototyping. CIRP Ann. Manuf. Technol. 1998, 2, 525-540.
Ligon, S.C.; Liska, R.; Stampfl, J.; Gurr, M.; Mülhaupt, R. Polymers for 3D Printing and Customized Additive Manufacturing. Chem. Rev. 2017, 117, 10212-10290.
Lipson, H.; Kurman, M. Fabricated: The New World of 3D Printing; John Wiley and Sons: Indianapolis, IN, USA, 2013.
Osborn, T.; Zhou, E.; Gerzeski, R.; Mollenhauer, D.; Tandon, G.P.; Whitney, T.J.; Iarve, E.V. Experimental and theoretical evaluation of stiffness properties of fused deposition modeling parts. In Proceedings of the American Society of Composites 30th Technical Conference, East Lansing, MI, USA, Sep. 28-30, 2015.
Percoco, G.; Lavecchia, F.; Galantucci, L.M. Compressive Properties of FDM Rapid Prototypes Treated with a Low Cost Chemical Finishing. J. Appl. Sci. Eng. Technol. 2012, 4, 3838-3842.
Pham, D.T.; Gault, R.S. A comparison of rapid prototyping technologies. Int. J. Mach. Tools Manuf. 1998, 38, 1257-1287.
Rane, R. (2018). Enhancing Tensile Strength of FDM parts using Thermal Annealing and Uniaxial Pressure [Masters Thesis, University of Texas at Arlington]. http://hdl.handle.net/10106/27796.
Rane, R.; Kulkarni, A.; Prajapati, H.; Taylor, R.; Jain, A.; Chen, V. Post-Process Effects of Isothermal Annealing and Initially Applied Static Uniaxial Loading on the Ultimate Tensile Strength of Fused Filament Fabrication Parts. Materials 2020, 13, 352.
Rodriguez, J.F. Modeling the Mechanical Behavior of Fused Deposition ABS Polymer Components. Ph.D. Thesis, University of Notre Dame, Notre Dame, IN, USA, 1999.
Rodriguez, J.F.; Thomas, J.P.; Renaud, J.E. Characterization of the mesostructure of fused-deposition acrylonitrile-butadiene-styrene materials. Rapid Prototyp. J. 2000, 6, 175-186.
Rodríguez, J.F.; Thomas, J.P.; Renaud, J.E. Mechanical behavior of acrylonitrile butadiene styrene (ABS) fused deposition materials. Experimental investigation. Rapid Prototyp. J. 2001, 7, 148-158.
Sood, A.K.; Ohdar, R.K.; Mahapatra, S.S. Experimental investigation and empirical modelling of FDM process for compressive strength improvement. J. Adv. Res. 2012, 3, 81-90.
Stafford, Jason & Walsh, Ed & Egan, Vanessa. (2009). Characterizing convective heat transfer using infrared thermography and the heated-thin-foil technique. Measurement Science and Technology. 20. 105401. 10.1088/0957-0233/20/10/105401.
Sun, Q.; Rizvi, G.M.; Bellehumeur, C.T.; Gu, P. Effect of processing conditions on the bonding quality of FDM polymer filaments. Rapid Prototyp. J. 2008, 14, 72-80.
Tolochko, N.K.; Arshinov, M.K.; Gusarov, A.V.; Titov, V.I.; Laoui, T.; Froyen, L. Mechanisms of selective laser sintering and heat transfer in Ti powder. Rapid Prototyp. J. 2003, 9, 314-326.
Turner, N.; Strong, R.; Gold, S.A. A review of melt extrusion additive manufacturing processes: I. Process design and modeling. Rapid Prototyp. J. 2014, 20, 192-204.
Wong, K.V.; Hernandez, A. A review of additive manufacturing. ISRN Mech. Eng. 2012.
Zein, D.W. Hutmacher, K.C. Tan, S.H. Teoh, Fused deposition modeling of novel scaffold architectures for tissue engineering applications, Biomaterials 4 (2000) 1169-1185.
Zhang, B.; Liao, H.; Coddet, C. Effects of processing parameters on properties of selective laser melting Mg-9% Al powder mixture. Mater. Des. 2012, 34, 753-758.
Ziemian, S.; Okwara, M.; Ziemian, C.W. Tensile and fatigue behavior of layered acrylonitrile butadiene styrene. Rapid Prototyp. J. 2015, 21, 270-278.

* cited by examiner

Successful print with cooling mechanism        Print failure without cooling mechanism

| Nozzle height | Estimate |
|---|---|
| 1 | 23.29 |
| 1.5 | 19.58 |
| 2 | 16.19 |

| Nozzle height | Estimate |
|---|---|
| 1 | 2159.0 |
| 1.5 | 1465.9 |
| 2 | 1029.35 |

| Plate Thickness | Estimate |
|---|---|
| 10 | 1742.73 |
| 5 | 1686.5 |
| 2 | 1225.05 |

FUSED FILAMENT FABRICATION PRINT HEAD SYSTEM

CROSS REFERENCE TO RELATED APPLICATIONS

This application claims the benefit of U.S. Provisional Patent Application No. 63/370,831 filed Aug. 9, 2022, the contents of which are incorporated herein by referred in its entirety.

BACKGROUND

Recent times have seen an evolution of the different manufacturing techniques used to fabricate highly accurate and complex parts. Additive manufacturing (AM) is one such set of techniques that has gained popularity due to its cheap feedstock, ease of accessibility, and most importantly its capability to fabricate parts that would otherwise be difficult to do with conventional methods. AM uses digital technology to fabricate parts, unlike the conventional mold manufacturing methods which use complex designing Fused Filament Fabrication (FFF) is one of the most common AM techniques in terms of the number of parts fabricated and printers worldwide. In FFF, a Computer-Aided Design (CAD) model is used to manufacture the final part by depositing one hot extrudate onto another. FFF can be differentiated from most AM techniques because it does not use an energy source that rasters over a powder bed, selectively bonding the powder due to melting and solidification to fabricate the final geometry. As shown in FIG. 1, in FFF systems, a thermoplastic filament is heated above its glass transition temperature to form a polymer melt which is dispensed through a heated liquefier onto a heated build platform. With the help of a gantry, the print nozzle is moved in the x-y plane as it deposits the material whereas either the bed or the nozzle is moved in the z-direction for out-of-plane movement. However, parts printed using FFF suffer from subpar mechanical properties as compared to their injection-molded counterparts.

When the FFF systems deposit the polymer melt, the adjacent filament rasters merge into each other resulting in the formation of inter-laminar bonds or necks. As the temperature of the melt approaches the glass transition temperature, the polymer melt becomes highly viscous which leads to a halt in the neck formations. Thus, it can be seen that the thermally-driven neck formation and growth aids in the inter-laminar bonds thus impacting the mechanical strength of FFF parts. It is also known that print parameters like print temperatures, air gap, and print orientations affect the mechanical properties of FFF parts, but it is the imperfect weld lines and inter-laminar bonding that predominates these factors. Porosity is an intrinsic defect seen in FFF parts due to the use of circular nozzles leading to imperfectly stacked layers due to the rounded features. This further leads to the formation of long void gaps between two adjacently deposited polymer beads accentuating the premature failure of the FFF parts.

Temperature and heat transfer also affect the properties of FFF parts. Complex temperature distribution around the deposited polymer melt combined with heat transfer between adjacent filaments has been shown to determine the quality of the bond. Post-process thermal annealing has been shown to increase the inter-laminar bonding by heating the part well beyond its glass transition temperature resulting in a significant increase in the mechanical strength of the parts. Although this method does lead to a substantial increase in strength, the geometric accuracy of the part is compromised. Also, applying a post-process thermal load increases the total build time of the final part. Other approaches have been studied to provide an external heating source to facilitate inter-laminar bonding such as microwave heating or complex setups of different optics, mirrors, and near-infrared laser beams. However, these approaches utilize intricate, expensive, and additional equipment further complicating the FFF process.

Accordingly, there is a need for a system that improves the mechanical properties of fused filament fabrication parts without being overly complex, expensive, or time-consuming.

SUMMARY

In one aspect, a fused filament fabrication print head system is disclosed, the system including: a nozzle, the nozzle defines a nozzle opening and a filament flow path and is configured to deposit a filament through the nozzle opening; a heating block coupled to the nozzle such that the filament flow path extends through the heating block, the heating block including a heating element; and a cooling element spaced apart from the heating block along the filament flow path, the cooling element being configured to provide localized cooling to a portion of the filament at a location along the filament flow path prior to the heating block; wherein the localized cooling provided by the cooling element preserves the stiffness of the filament and ensures sufficient back pressure to push the filament through the heating block and the nozzle opening.

In another aspect, a fused filament fabrication print head system is disclosed, the system including: a nozzle that defines a nozzle opening, the nozzle being configured to deposit a filament through the nozzle opening; a heating block coupled to the nozzle, the heating block including a heating element; and a cooling element; and a filament flow path, the filament flow path extending through the cooling element, to the heating block, through the nozzle, and out the nozzle opening; wherein the cooling element is spaced apart from the heating block prior to the heating block along the filament flow path, wherein a portion of the filament flow path that extends through the cooling element receives localized cooling from the cooling element, and wherein the localized cooling provided by the cooling element preserves the stiffness of the filament and ensures sufficient back pressure to push the filament through the heating block and the nozzle opening.

BRIEF DESCRIPTION OF THE DRAWINGS

Example features and implementations are disclosed in the accompanying drawings. However, the present disclosure is not limited to the precise arrangements and instrumentalities shown.

DETAILED DESCRIPTION

Disclosed herein is a fused filament fabrication print head system that is configured to apply an in-situ thermal load while the part is being printed. The in-situ thermal load preserves the stiffness of the filament and ensures sufficient back pressure to push the filament through the heating block and nozzle opening which increases the mechanical properties of the part being printed.

Various implementations include a fused filament fabrication print head system. The system includes a nozzle, a heating block, and a cooling element. The nozzle defines a nozzle opening and a filament flow path and is configured to deposit a filament through the nozzle opening. The heating block is coupled to the nozzle such that the filament flow path extends through the heating block. The heating block includes a heating element. The cooling element is spaced apart from the heating block along the filament flow path and is configured to provide localized cooling to a portion of the filament at a location along the filament flow path prior to the heating block. The localized cooling provided by the cooling element preserves the stiffness of the filament and ensures sufficient back pressure to push the filament through the heating block and nozzle opening.

Figure 1:
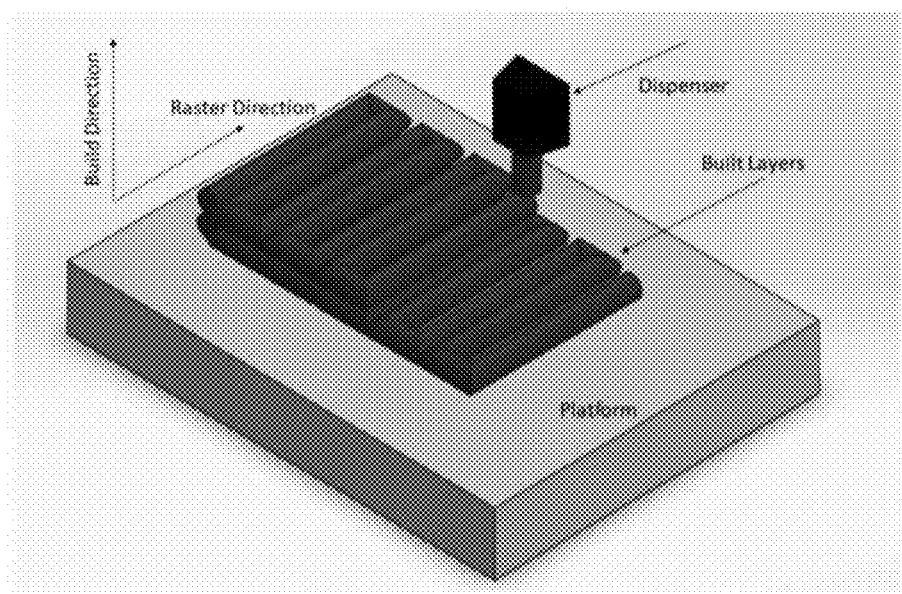
FIG. 1 shows a schematic for filament deposition in FFF systems.
Figure 2:
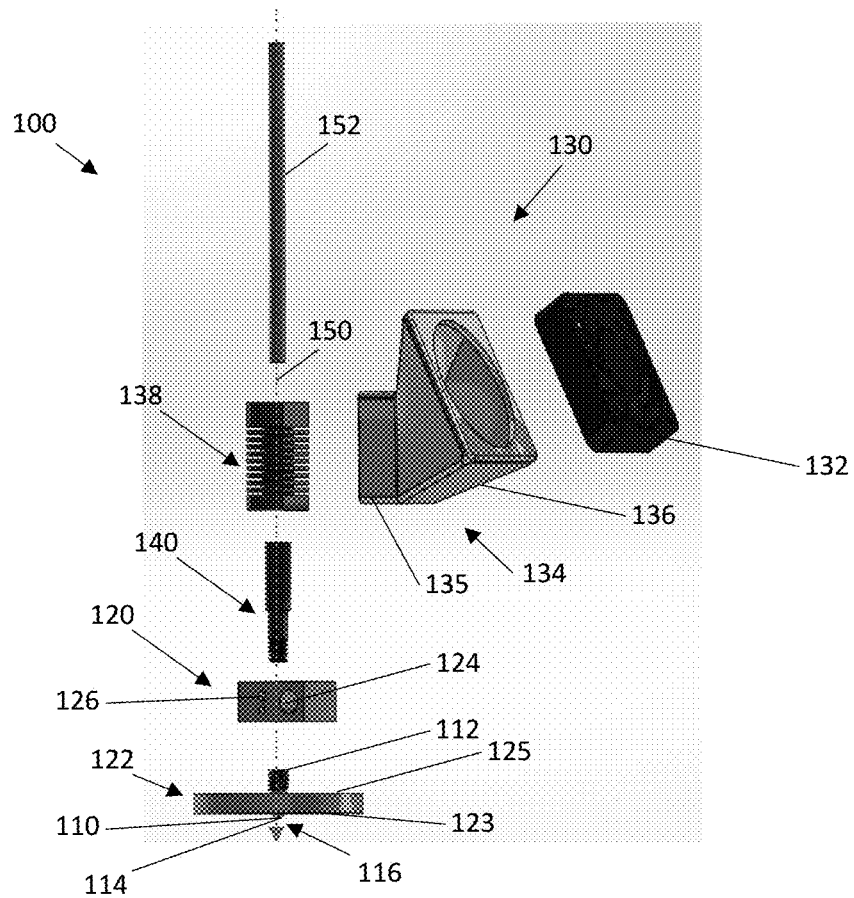
FIG. 2 shows a fused filament fabrication print head system, according to one implementation.

Various other implementations include a fused filament fabrication print head system. The system includes a nozzle, a heating block, a cooling element, and a filament flow path. The nozzle defines a nozzle opening and the nozzle is configured to deposit a filament through the nozzle opening. The heating block is coupled to the nozzle and includes a heating element. The filament flow path extends through the cooling element, to the heating block, through the nozzle, and out the nozzle opening. The cooling element is spaced apart from the heating block prior to the heating block along the filament flow path. A portion of the filament flow path that extends through the cooling element receives localized cooling from the cooling element. The localized cooling provided by the cooling element preserves the stiffness of the filament and ensures sufficient back pressure to push the filament through the heating block and nozzle opening FIG. 2 shows an implementation of the fused filament fabrication print head system 100. The system 100 includes a nozzle 110, a heating block 120 (also referred to as a heater block), a cooling element 130, a throat 140, and a filament flow path 150.

The nozzle 110 includes a first end 112 and a second end 114 spaced apart from the first end 112. The nozzle 110 also defines a nozzle opening 116. The nozzle 110 is configured to deposit a filament through the nozzle opening 116 during fused filament fabrication.

The heating block 120 is coupled to the nozzle 110 and includes a plate 122, a heating element 124, and a thermocouple 126. In some implementations, the plate is integrally formed with the nozzle. Although, in other implementations, the nozzle is removably couplable to the plate and/or the heating block. The first end 112 of the nozzle 110 is adjacent to the heating block 120, and the second end 114 is spaced away from the heating block 120. The distance from the second end 114 of the nozzle 110 to the heating block 120 ranges from 0.5 mm to 2.5 mm.

The plate 122 is for in-situ annealing, is circular, and includes a first surface 123 and a second surface 125 opposite the first surface 123. The diameter of the plate 122 in FIG. 2 is 100 mm, and the thickness of the plate 122 is 5 mm. However, in other implementations, the diameter of the plate ranges from 10 mm to 610 mm, e.g., from 10 to 500, from 100 to 400, from 200 to 300, from 10 to 100, from 200 to 610 mm. The thickness of the plate ranges from 1 mm to 100 mm, e.g., from 1 to 75, from 10 to 50, from 25 to 75, or from 1 to 50 mm. Also, the ratio of the thickness to diameter can range from 1 mm:10 mm to 51 mm:10 mm. The ratio of plate thickness to diameter can also vary from 0.01 to 1. Also, in some implementations, the plate comprises brass, stainless steel, hardened steel, bronze, copper, aluminum, tungsten, or any alloy thereof, or other suitable thermally conductive material, or combination thereof. In one implementation, the plate can be made of ruby. The nozzle can also be made of any of these listed materials. Also, in other implementations, the plate includes a vapor chamber (a two-phase heat transfer device).

The nozzle 110 is adjacent the first surface 123 of the plate 122, and the heating element 124 and thermocouple 126 are adjacent the second surface 125 of the plate 122.

The heating element 124 includes a heating liquefier and heats up the heating block 120 as well as the filament disposed along the filament flow path 150. The heating element 124 is disposed within the heating block 120 such that it is spaced away from the filament flow path 150 as shown in FIG. 2. The thermocouple 126 is disposed within the heating block 120 adjacent to the filament flow path 150 to monitor the temperature of the filament.

The cooling element 130 is disposed prior to the heating block 120 along the filament flow path 150 and includes a fan 132, a duct 134, and a plurality of fins 138. The fan 132 is spaced apart from the filament flow path 150 via the duct 134, and the fan 132 provides localized cooling to a portion of the filament flow path 150. The duct 134 includes a first portion 135 that is adjacent the filament flow path 150 and a second portion 136 that extends at an angle of 30 degrees from the first portion 135 of the duct 134. The second portion 136 of the duct 134 is coupled to the fan 132 and directs the airflow from the fan 132 towards the filament flow path 150. Although the second portion 136 of the duct 134 extends from the first portion 135 of the duct at an angle of 30 degrees in FIG. 2, in other implementations, the second portion of the duct extends from the first portion of the duct at any suitable angle between 0 and 90 degrees.

The plurality of fins 138 is disposed around a portion of the filament flow path 150 that receives localized cooling from the fan 132.

The throat 140 is disposed along the filament flow path 150 at least around the portion of the filament flow path 150 that receives localized cooling from the fan 132 and extends to the heating block 120. In some implementations, the throat comprises a metal, a non-metal such as ceramic, or any combination thereof. In implementations in which the throat comprises a non-metal, the throat may behave as an insulator to break heat transfer effectively and possibly reduce the need for localized cooling.

The filament flow 150 path further includes a Teflon tube 152 that feeds the filament to the throat 140, through the cooling element 130, through the heating block 120, and out the nozzle opening 116. A portion of the filament flow path that extends through the cooling element 130 receives localized cooling from the cooling element 130. The localized cooling provided by the cooling element 130 preserves the stiffness of the filament and ensures sufficient back pressure to push the filament through the heating block 120 and nozzle opening 116.

Figure 29:
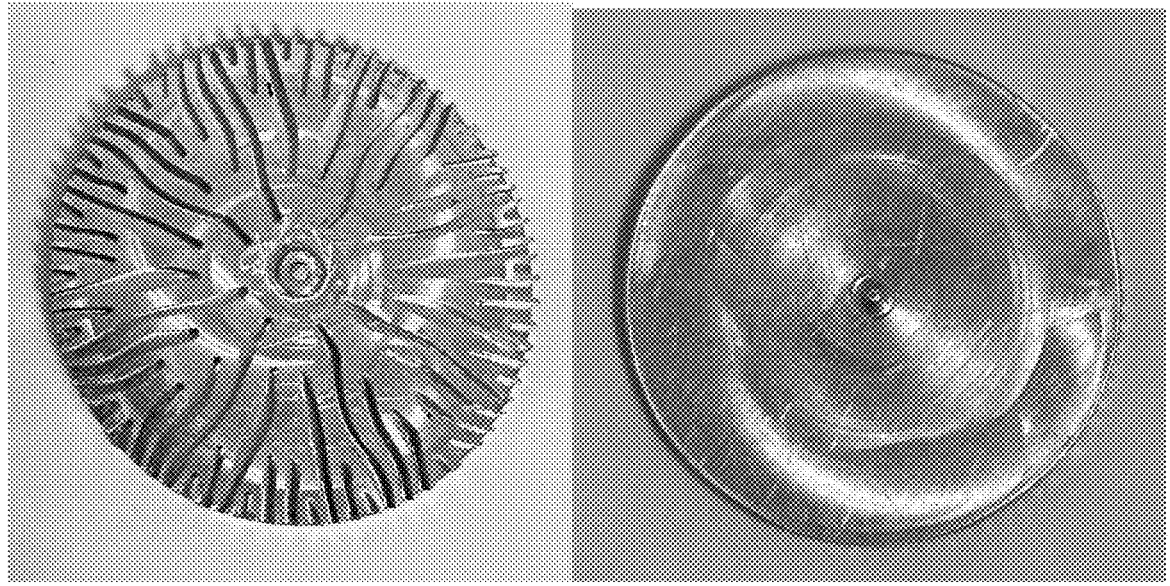
FIG. 29 shows a top and bottom view of a plate optimized for thermal performance and mass reduction, according to one implementation.

FIG. 29 shows one example of a plate optimized to promote heat transfer and reduce weight. By reducing the weight of the plate, the overall performance of the printer may be enhanced by improving both the speed and quality of the 3D-printed parts.

Figure 30:
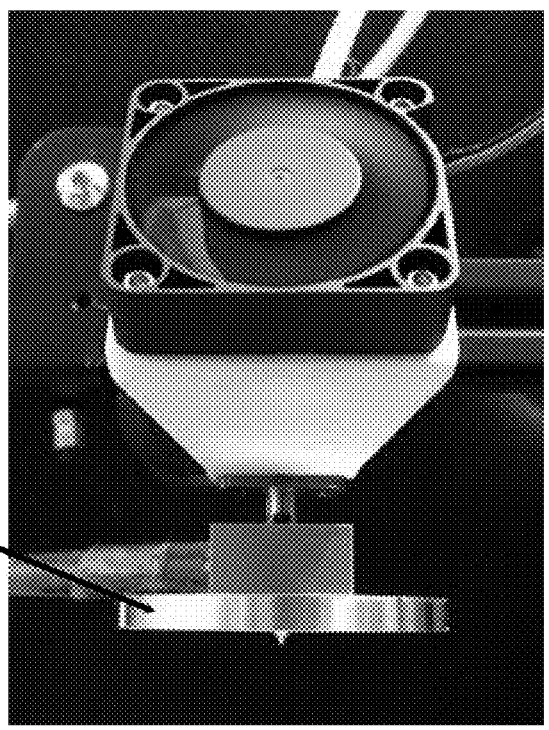
FIG. 30 is a side view of the novel printhead with the plate before optimization, according to one implementation.
Figure 31:
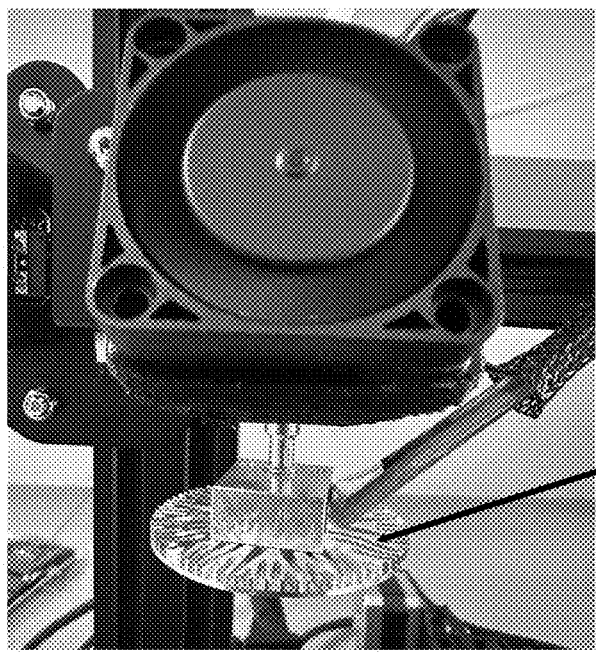
FIG. 31 shows the mass-optimized printhead wherein the plate has been milled down to reduce the overall mass, according to one implementation.

FIGS. 30-33 show images of a plate optimized to promote heat transfer, reduce weight, and accept an insulator, according to another implementation. As shown, FIG. 30 is a side view of the novel printhead with the plate 300 before optimization. FIG. 31 shows the mass-optimized printhead wherein the plate 301 has been milled down to reduce the overall mass such that the remaining mass is strategically placed for heat transfer. The mass-optimized plate 301 shown in FIG. 31 measures 30 grams in contrast to the original plate 300 in FIG. 30.

In another example, an insulator may be disposed on top of the hot end plate to prevent heat from escaping. Such an insulator ensures a stable and consistent temperature of the hot end of the printing device. This temperature consistency aids in achieving high-quality prints with high precision.

Figure 32:
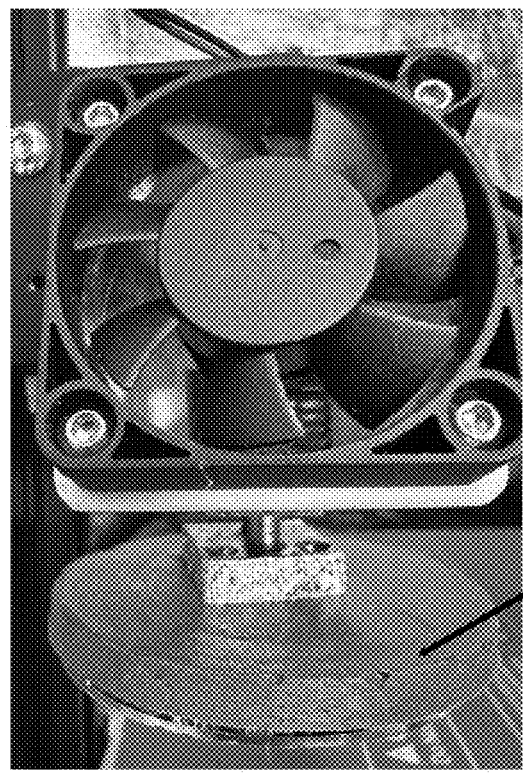
FIG. 32 shows the same example printhead of FIG. 31 with an insulator disposed on top of the plate, according to one implementation.
Figure 33:
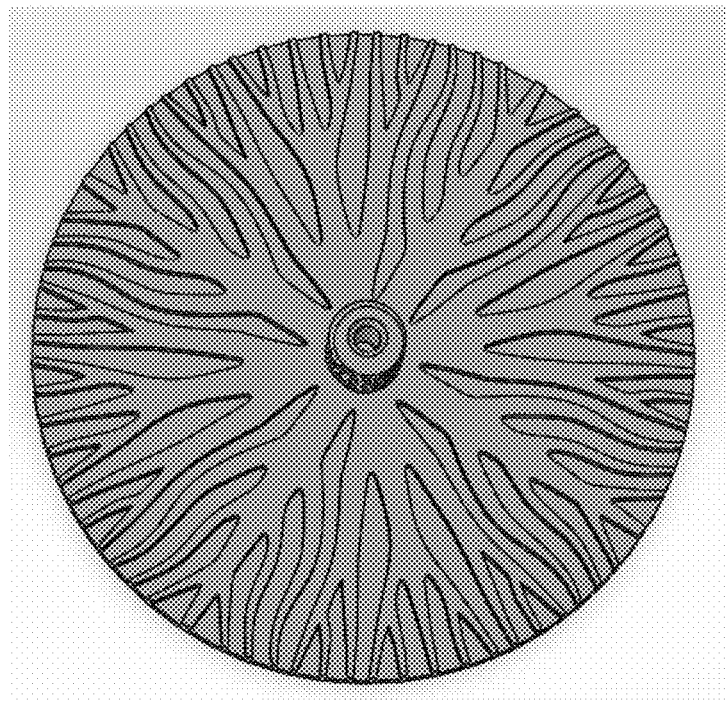
FIG. 33 provides a CAD model image of a mass-optimized plate similar to that of FIG. 31, according to one implementation.

FIG. 32 shows the same example printhead of FIG. 31 with the insulator 302 disposed on top of the plate 301. FIG. 33 provides a CAD model image of a mass-optimized plate similar to that of FIG. 31. The insulator 302 may be configured to fit over the mass-optimized plate of FIGS. 31 and 33.

Notwithstanding to be bound by this theory, in some implementations, it is advantageous for the plate to have the smallest mass possible, and still transfer heat sufficiently.

It is also contemplated that the environmental temperature, humidity, and pressure can affect the printed parts. Thus, one can adjust the environmental temperature, humidity, and pressure to achieve a desired result.

EXAMPLES

Example 1: Testing and Experimental Results

Experiments were performed using a two-way full factorial analysis to study and characterize the ultimate tensile strength (UTS) and to obtain a statistical model utilizing different combinations of block thickness and nozzle height from the block. Analysis of Variance (ANOVA) was also conducted to test the significance of each factor on the increase in UTS and find the optimum value. An analytic model of the heating block of the fused filament fabrication print head system with and without the cooling setup was performed to study its utility and effectiveness in printing tall and slender parts. Characterization of the change in the cross-sectional area was done to see how the heating block of the fused filament fabrication print head system affected the geometric accuracy of the parts. Computer Tomography (CT) scans and image processing was used to analyze the change in the characteristic long voids seen between adjacent rasters and to study the overall reduction in void area sand stress intensity factors.

Figure 3:
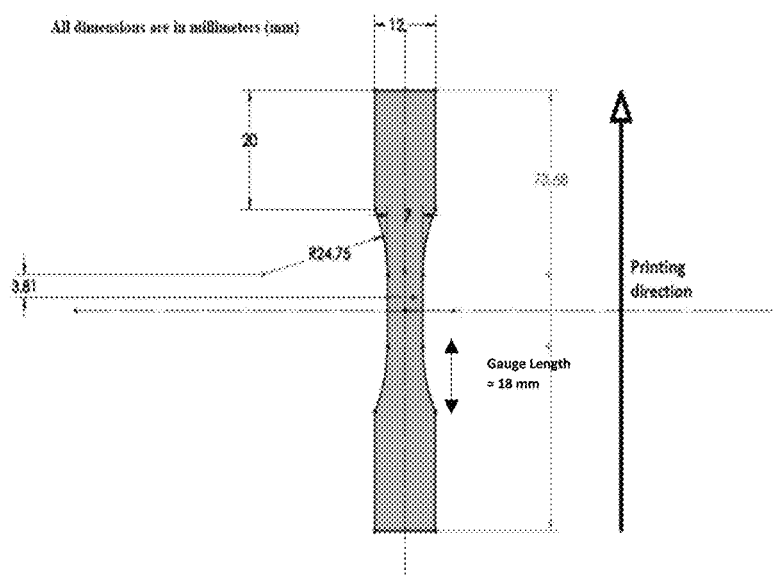
FIG. 3 shows the dimensions of a modified ASTM D638-02a specimen.
Figure 4:
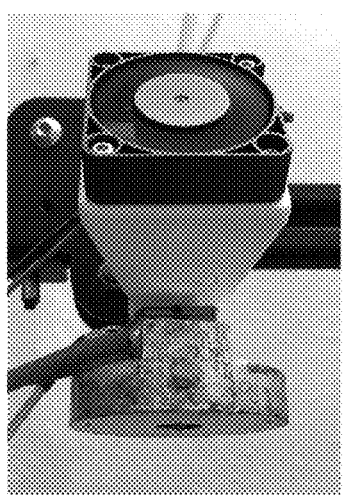
FIG. 4 shows a fused filament fabrication print head system, according to one implementation.
Figure 4:
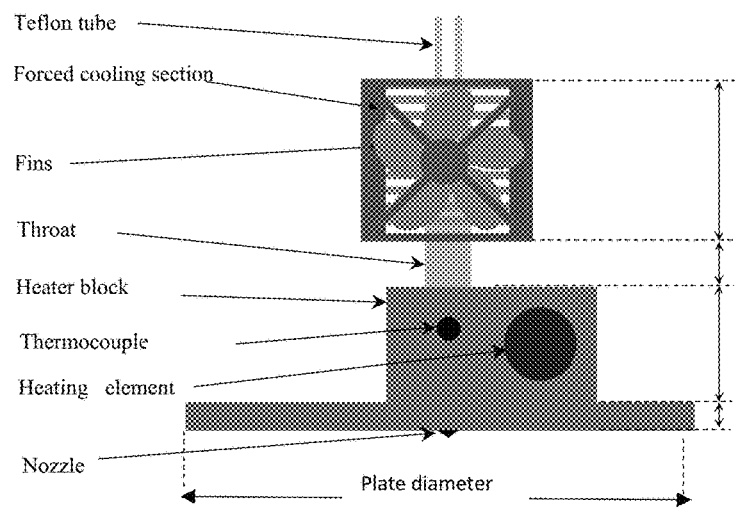

For the experiments, the parts were printed using Polylactic Acid (PLA) filament (Hatchbox 3D, Pomona, CA, USA) of 1.75 mm diameter. Tensile test coupons (dog bones) were printed using a modified design of the ASTM D638-02a standards as shown in FIG. 3. The tensile test coupons were designed on SOLIDWORKS 2016 (Dassault Systems, Waltham, MA, USA) and converted to G-Code using Simplify3D software. FIG. 4 shows the experimental setup consisting of Creality Ender 3 Pro printer with the disclosed fused filament fabrication print head system. The print and bed temperature were kept at 473 K (200° C.) and 333 K (60° C.) respectively and printed with a 0.4 mm brass nozzle. The infill percentage for the coupons was kept at 100% with no perimeter shells. The dog bone samples were printed with their longest dimension parallel to the build direction (z-direction). This was done to achieve an accurate representation of the weak inter-laminar bonds between two adjacent layers and therefore provide results for increase in UTS for the weakest inter-laminar bonds. The infill raster angle was kept at 0 to obtain maximum inter-laminar bond area.

Figure 5:
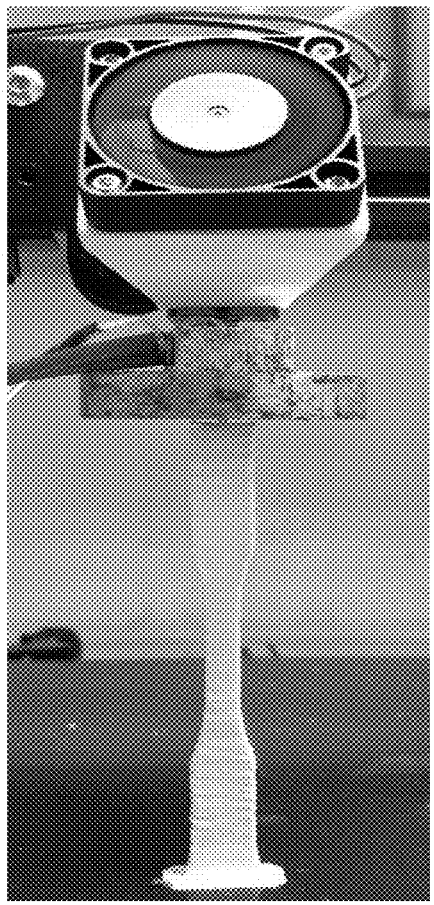
FIG. 5 shows an example of issues due to softening of the filament due to the absence of localized cooling.
Figure 5:
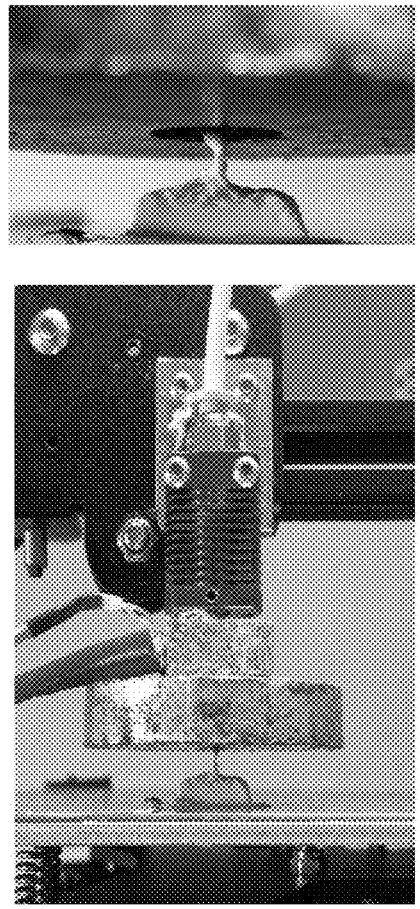

The circular aluminum heater block discs were 50 mm in radius and had 3 levels of thickness: 2 mm, 5 mm and 10 mm. The nozzle height from the block was adjusted to 3 levels: 1 mm, 1.5 mm, and 2 mm. To ensure consistency, the printer was placed in an enclosed room with desiccant to avoid humidity issues. A cooling fan with a duct was provided for localized cooling above the heated liquefier region as seen in FIG. 4. Localized cooling is advantageous because preliminary tests showed that the heat generated due to the block may travel upwards via conduction and convection leading to softening of the filament in the upper sections of the extrusion chamber possibly causing print failure after printing some layers as seen in FIG. 5.

Figure 6:
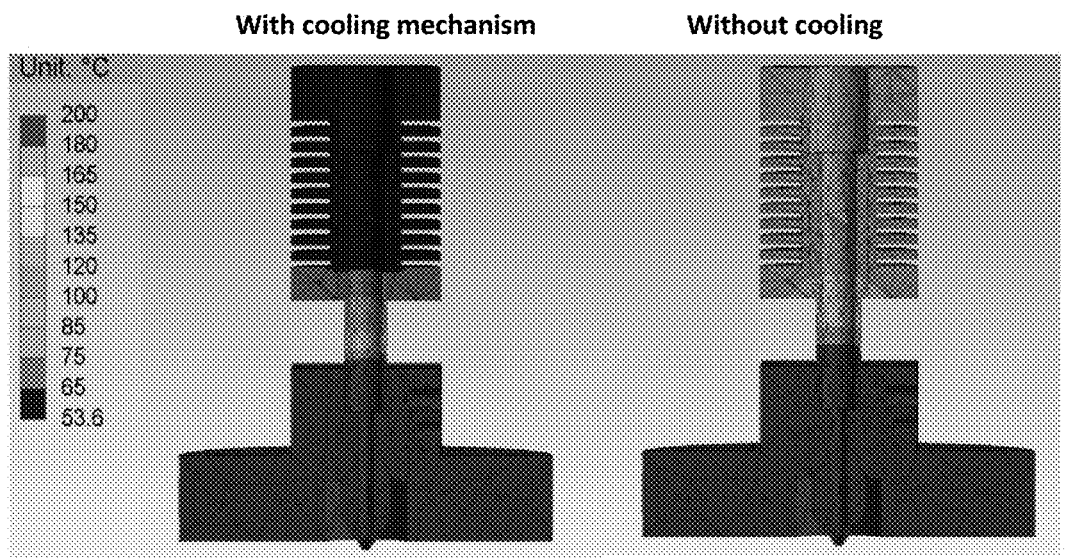
FIG. 6 shows the temperature distribution in an implementation of the fused filament fabrication print head system with and without a cooling element.

Standard hot ends provide fans to cool the part being printed as well as the upper sections of the extrusion chamber but using these attachments results in the heater block being continuously cooled leading to extended wait times in heating up the heater block and thermal runaway errors in the printer. Thus, using the disposed localized cooling solves the issues discussed. To study the effect of the cooling mechanism on temperature distribution in the assembly, a steady-state thermal analysis was run on the system with and without a fan as shown in FIG. 6. For the part without the fan, a convective boundary condition was applied over the fins with a heat transfer coefficient of 10 $W/m^{2-} K^{-1}$ was chosen for which stands true with the ambient conditions for natural convection. Whereas for the assembly with a 40 mm fan, a convective boundary condition with a heat transfer coefficient of 100 $W/m^{2-} K^{-1}$ was applied over the fins section of the assembly. The simulations show that the temperature in the throat is much higher for the assembly without a fan whereas the temperature in the throat falls below the glass transition temperature of PLA when a fan is used.

FFF systems require the filament to maintain its structural integrity before entering the heated liquefier to act as a piston and push out the polymer melt through the nozzle, which is achieved by using the cooling mechanism. Also, by localizing the cooling area, the specimen and the block can be maintained at a higher temperature resulting in better welding between layers. Thus, a localized cooling mechanism not only solves the issue of printing slender parts oriented in the z-direction but also allows for better welding between adjacent layers.

Each part was printed separately to avoid compounding error and provide replications for the different factor levels. The parts were then tested under tensile loading using a Shimadzu Tensile Testing machine. To apply the tensile load a displacement control of 5 mm/s was applied on the specimens using a 5 kN Load cell. The data obtained from the tensile tests was in the form of Load versus Stroke which was converted to stress versus strain by dividing by the appropriate values of area and length, respectively. The maximum value of stress of each specimen was considered as the ultimate tensile stress whereas the area under the curve was calculated to obtain the toughness (strain energy) of the parts. The stiffness of the parts was calculated in accordance with the ASTM Standard D638 by providing appropriate toe compensation and assuming Hookean behavior in the lower sections of the Stress-Strain curve.

The experiments and analysis were conducted using a full-factor DOE for two response variables: Increase in Ultimate Tensile Stress and Increase in Toughness. To obtain a comprehensive statistical model and the factor level effects, 3 levels of nozzle height and plate thickness were chosen as summarized in Table 1. The two-way full factorial DOE runs for each combination of factors mentioned in Table 1. Thus, the experimental design included a total of 9 treatment combinations with 5 replications for each treatment. To avoid systematic biases the treatments were performed in a randomized order. Each part was printed separately on the Creality Ender 3 and took 68 minutes to print. After each print, the brim (skirt) around the specimen was carefully removed with no further post-processing on the specimen. After completing all the treatments, the parts were tested under a tensile load to obtain the ultimate tensile strength and toughness. The reference values were obtained by printing 25 specimens with the same G-code as the treatments, using the stock heater block assembly as provided with the Creality Ender 3. The increase in tensile strength and toughness is obtained by subtracting the values obtained for the control specimens with those of the treatment combinations. Values of stress, strain, and toughness were calculated using MATLAB and the statistical analysis was performed using SAS (SAS Institute Inc; Cary, NC).

TABLE 1

Nozzle height and Plate Thickness levels for the design of experiments.

| Levels | Nozzle Height (mm) | Plate Thickness (mm) |
|---|---|---|
| 1 | 1 | 2 |
| 2 | 1.5 | 5 |
| 3 | 2 | 10 |

Results

For the heater block assembly, a finite volume simulation model was studied to analyze the temperature field around the block during motion. In the following discussion, the DOE assumptions have been verified and the appropriate statistical model along with the ANOVA analysis has been stated.

Finite Volume Simulation Model

Figure 7:
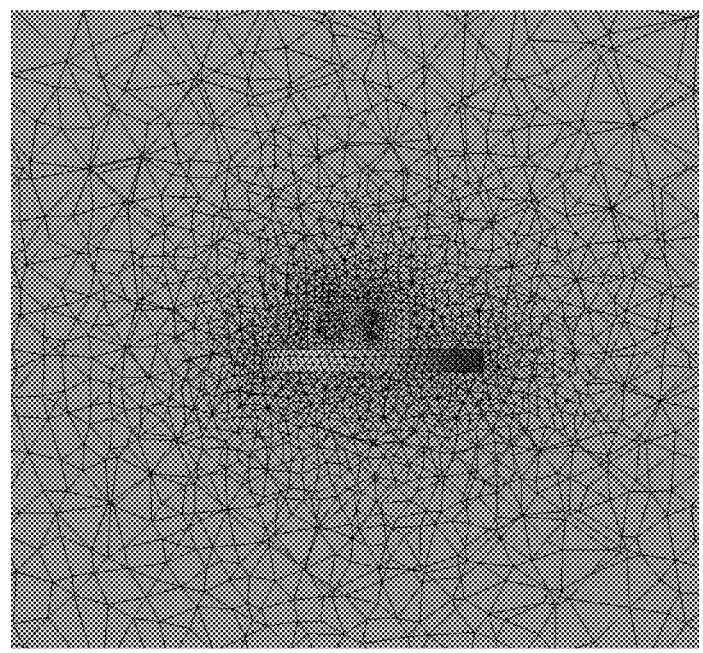
FIG. 7 shows meshing of the block enclosed in air.

The temperature of the previously deposited layers was affected by 2 heat sources: the hot-dispensed polymer melt and the block. A finite volume simulation was run to study the effect of the block combined with the nozzle on the previously deposited layers. The simulations are carried out on ANSYS Fluent. The transient state simulation is performed on the block motion using dynamic mesh motion. As shown in FIG. 7, linear motion in the x-axis is provided to the block and a new mesh is formed at each timestep as the block moves in the ambient air volume.

A Computer Aided Design (CAD) model of the block was also built using Solidworks. In the model, the heater block was maintained at 473 K while keeping the ambient air at 300 K. Natural convection boundary conditions were applied to the surface of the block. The block was defined as a rigid body and motion was allocated to it using a user defined function (UDF). The speed of the block was maintained at 60 mm/s (the default print speed in most printers). The time step was kept at 0.01 s which is much smaller than the local cell size, this prevents negative cell volume and cell degeneration issues. With each time step, local remeshing was done for cells significantly affected by the rigid body motion of the block. This was done to account for issues like cell size exceeding minimum or maximum size criteria and excessive skewness. FIG. 7 shows the meshing of one of the blocks. A sizing mesh method was applied around the block for a finer mesh and accurate heat transfer results.

Raw Increase in Strength and Strain Energy Due to Nozzle Height Variation From the Block a) Raw Increase in Ultimate Tensile Strength

Figure 8:
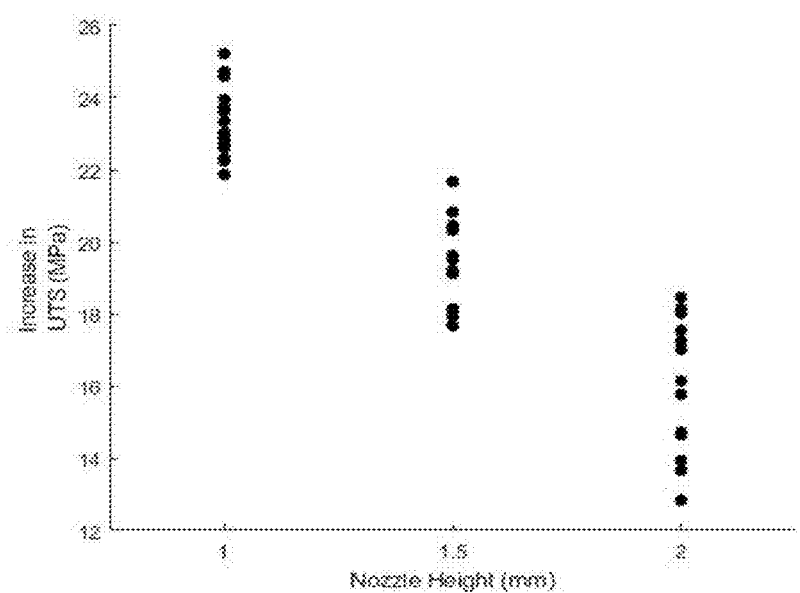
FIG. 8 shows a graph of the raw increase in strength against nozzle height.
Figure 9:
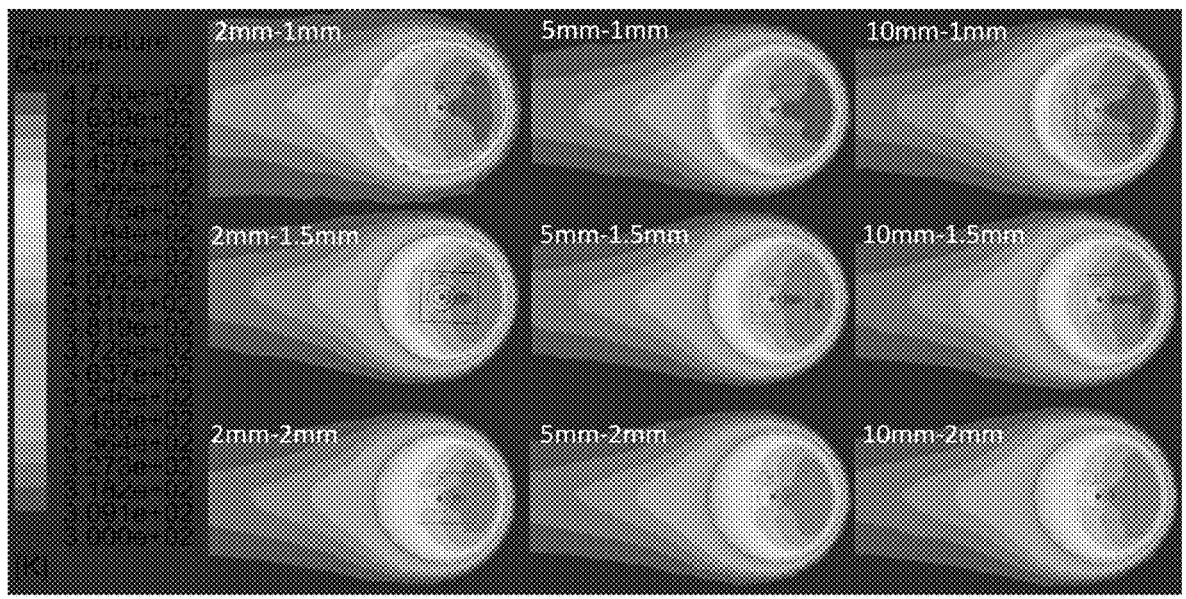
FIG. 9 shows a simulation model of temperature contours on a plane 0.3 mm away from the nozzle.
Figure 10:
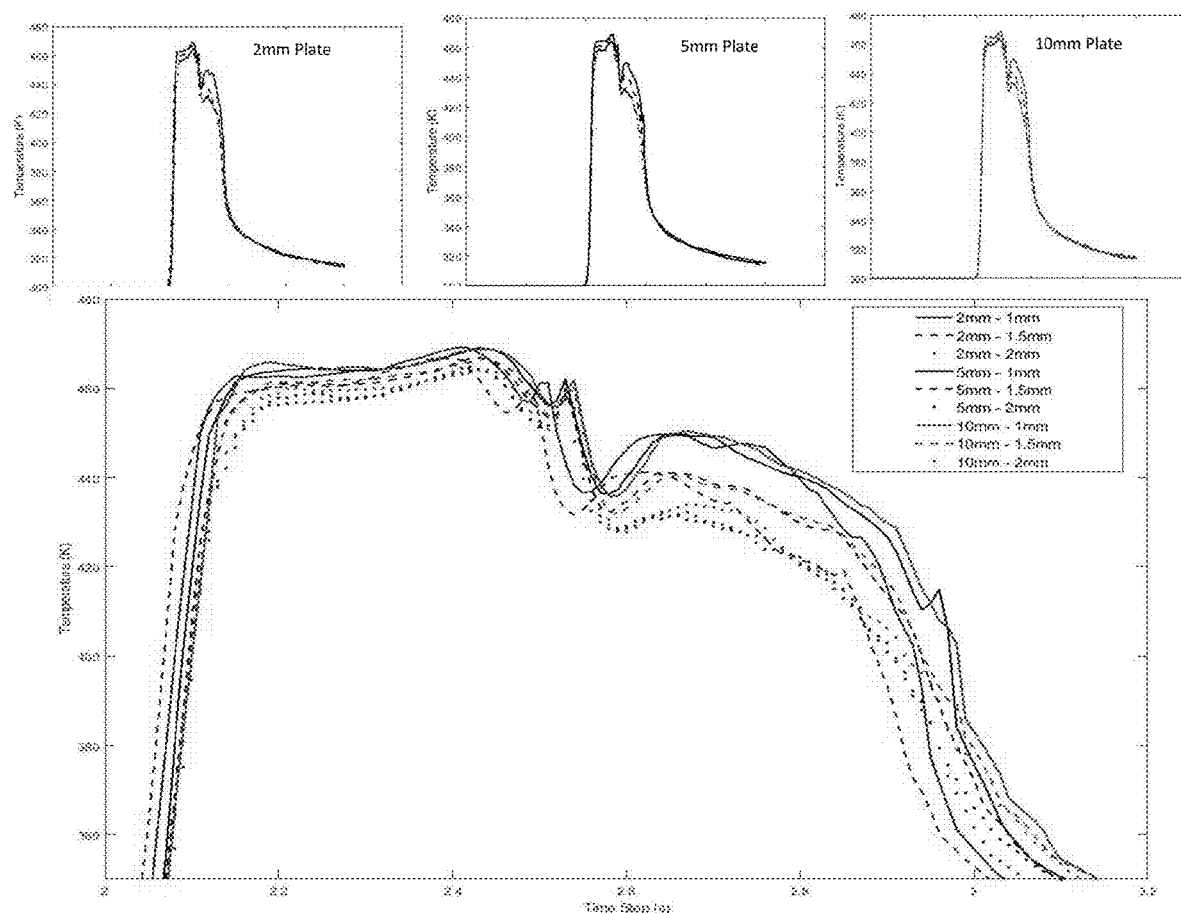
FIG. 10 shows multiple graphs of temperature vs time steps.

FIG. 8 shows an increase in ultimate tensile strength with respect to the nozzle height. As nozzle height increases from 1 mm to 2 mm, a fall in the average ultimate tensile is obtained. As the nozzle height approaches 2 mm, the top layer is exposed to a lower temperature field as compared to that when the nozzle height is kept at 1 mm. This can be seen from the contour plots obtained from the simulation models in FIG. 9. FIG. 10 shows the temperature profile at a predefined plane 0.3 mm away from the nozzle. FIG. 10 also shows the temperature variation with time of a point on the defined plane as the block moves over it and shows that, as nozzle height increases from 1 mm to 2 mm, the temperature on this plane falls by approximately 10 K. But for different plate thicknesses, the temperature profile remains somewhat similar at the defined plane as seen from contour plots in FIG. 9. This difference in temperature profiles with changes in nozzle height affects the bonding between the layer being deposited and the previous layer. When the temperature of the previous layer is maintained at a higher level, an increase in strength is obtained due to better neck formation and reputation. As shown in this experiment, an average increase in the ultimate tensile strength of the parts falls from 23.3 MPa to 16.2 MPa as nozzle height is increased from 1 mm to 2 mm.

Figure 11:
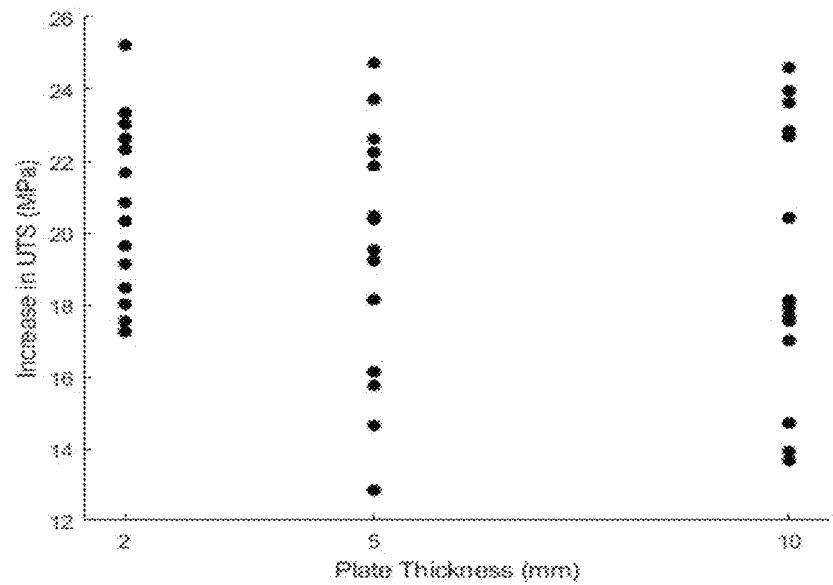
FIG. 11 shows a graph of raw increase in strength against Plate thickness.

However, on studying raw increase in strength with plate thickness as shown in FIG. 11, no trend or notable difference is seen. The average increase in strength is seen to be maximum for the 2 mm followed by 10 mm and 5 mm plates. The simulation models show that when the nozzle height is kept constant for different plate thicknesses, the top layer is exposed to the same maximum temperature as seen in FIG. 9. This gives rise to a necking and bond formation process which is similar across different plate thicknesses, thus showing no or little difference for increase in average ultimate tensile strength between different plate thicknesses.

Figure 12:
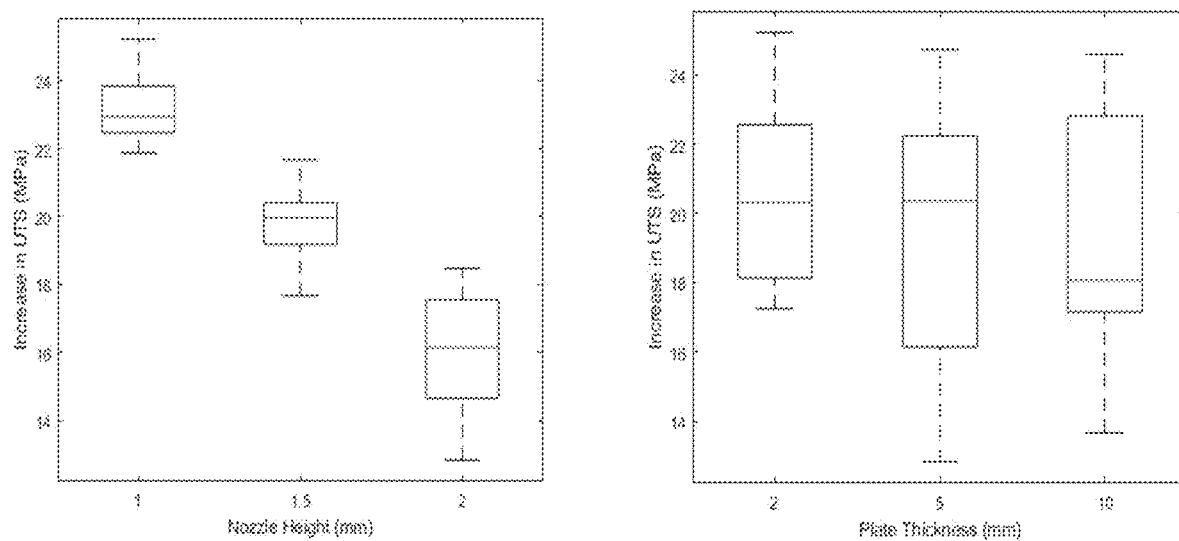
FIG. 12 shows a boxplot showing variance in the distribution of increase in UTS for different nozzle heights and a boxplot showing variance in the distribution of increase in UTS for different plate thicknesses.

When the variances from Boxplots in FIG. 12 are compared, it is seen that the nozzle height has a dominant effect on the increase in ultimate tensile strength of the parts as compared to the plate thickness. A general upward trend is noticed as the nozzle height is varied from 2 mm to 1 mm. No such trend can be concluded for the effect of plate thickness on the increase in ultimate tensile strength of the parts.

b) Raw increase in Toughness (Strain Energy)

Figure 13:
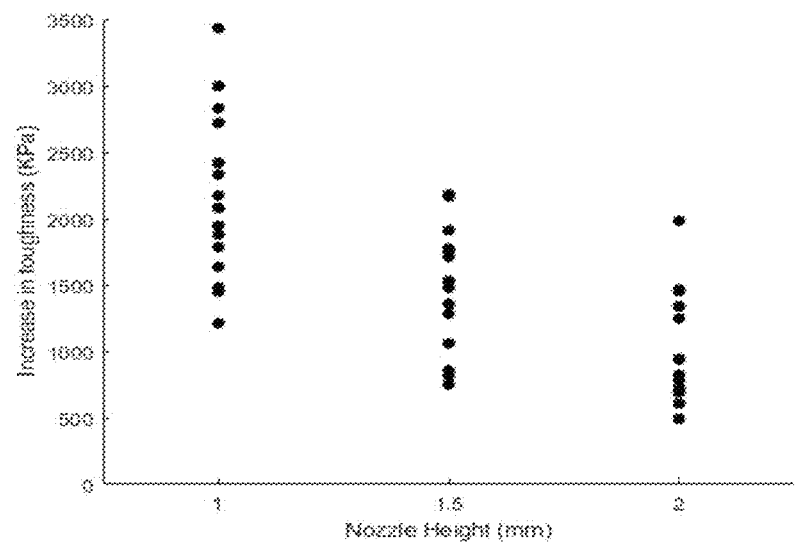
FIG. 13 shows a plot of raw increase in toughness against nozzle height.
Figure 14:
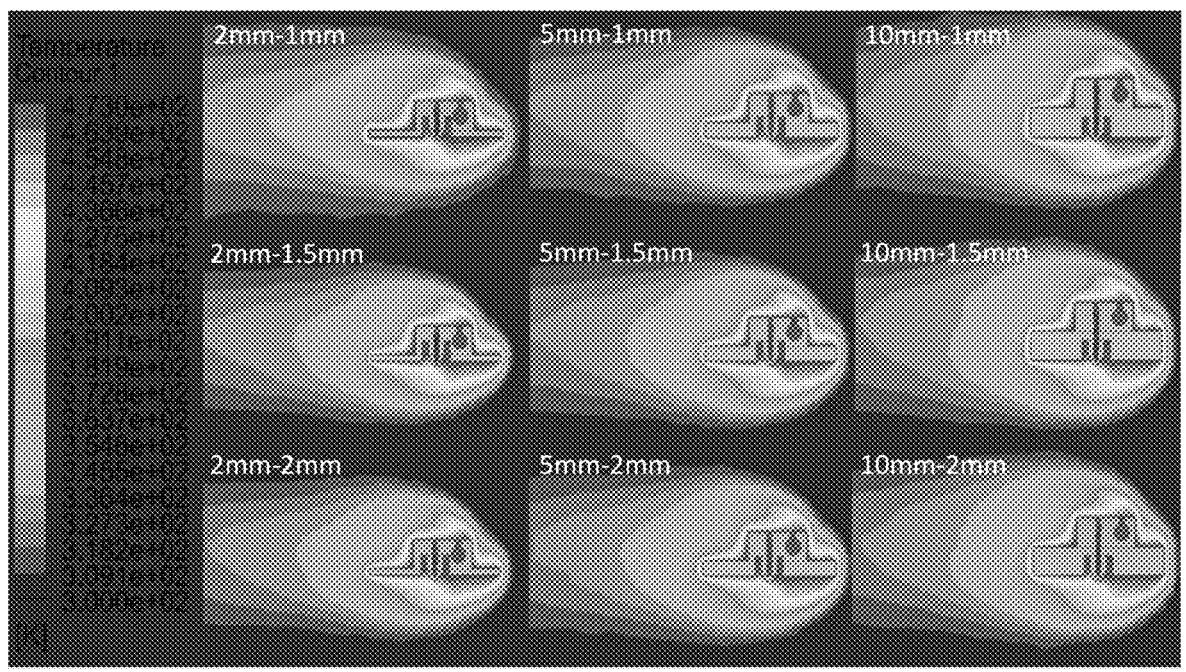
FIG. 14 shows a simulation model of temperature contours around the heater block of an implementation of the fused filament fabrication print head system.
Figure 15:
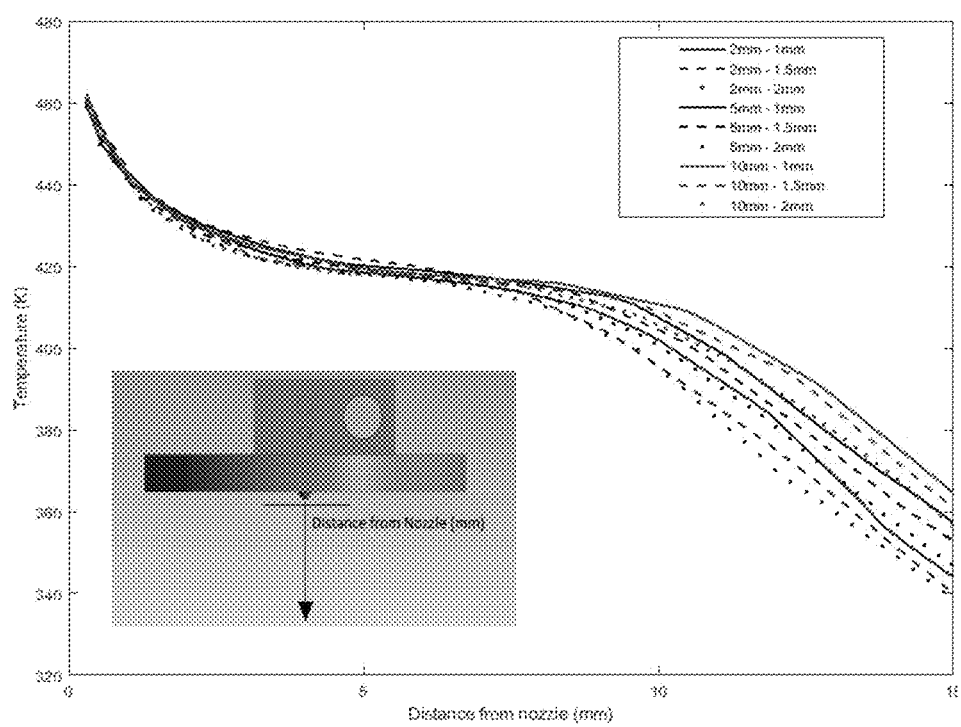
FIG. 15 shows the temperature variation in a direction away from the nozzle.

FIG. 13 illustrates that the effect of nozzle height on toughness is similar to its effect on UTS. As the nozzle height moves away from 1 mm to 2 mm, a consistent fall in the strain energy is seen. The average increase in toughness of the parts falls by more than 50% (2159.06 Kpa to 1029.35 Kpa) as the nozzle height increases from 1 mm to 2 mm. Increase in toughness can be correlated to the reptation across the interfaces which is influenced by the exposure temperature and time of the layers. For a nozzle height of 1 mm, the top layers are exposed to a much higher value of temperature as compared to the nozzle height of 2 mm, thus leading to a significant fall in toughness with an increase in nozzle height. Simulation models shown in FIG. 14 illustrate the temperature distribution around the plate. As shown with the vertical line in FIG. 15, as the distance from the nozzle increases, the temperature falls. This fall in temperature along a line starting 0.3 mm (layer height) below the nozzle to 15 mm has been plotted in FIG. 15. For different nozzle heights, the temperature field changes after 7 mm distance from the nozzle as seen in FIG. 15, and this is confirmed by the contour plots. This shows that for smaller nozzle heights the layers remain at a higher temperature for a longer time as compared to those with larger nozzle heights. Thus, it allows for greater reptation and intermingling of the polymer chain leading to enhanced toughness.

Figure 16:
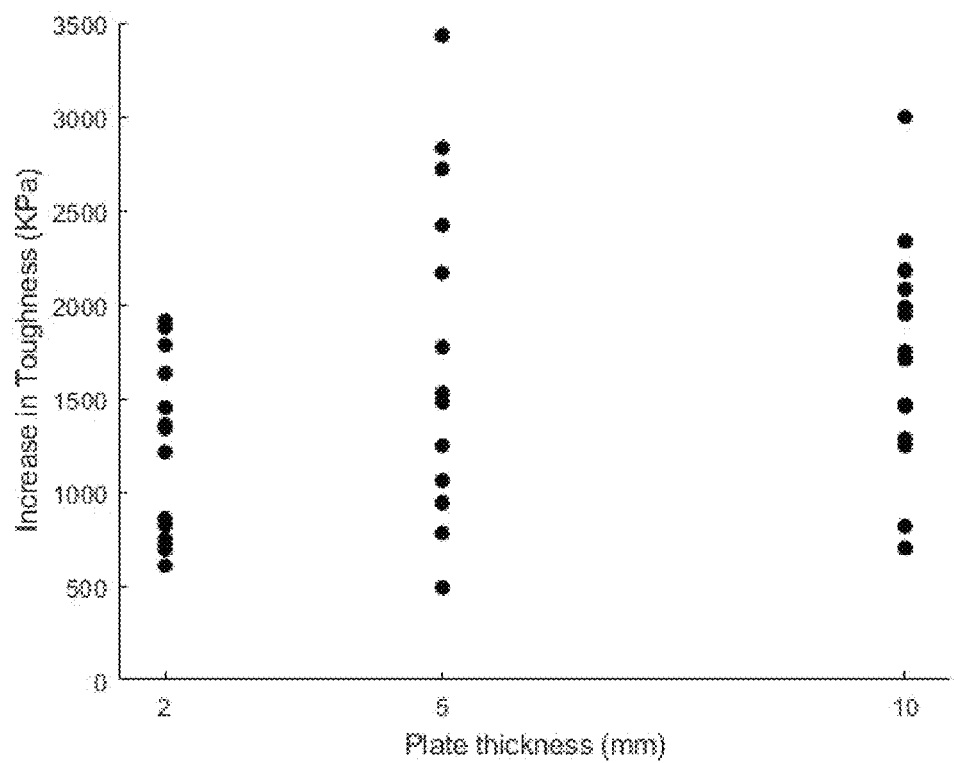
FIG. 16 shows a plot of raw increase in toughness against plate thickness.

FIG. 16 shows the effect of plate thickness on the raw increase in toughness. There is a general upward trend in the increase in average toughness as the plate becomes thicker. As the plate thickness increases from 2 mm to 10 mm, the increase in average toughness goes up from 1225.05 Kpa to 1742.73 Kpa. This can be attributed to the fact that for a larger plate, the layers are exposed to a higher value of temperature for a longer time duration. Simulation models from FIGS. 14 and 15 show that this hypothesis holds true.

FIG. 15 shows that for a 10 mm thick plate the temperature at a distance of 10 mm from the nozzle is around 420 K whereas for the 2 mm thick plate at the same distance, the temperature is 410 K. Also, the plots show that the temperature gradient is much more gradual for the 10 mm plate whereas a steeper fall is seen for the 2 mm plate.

Figure 17:
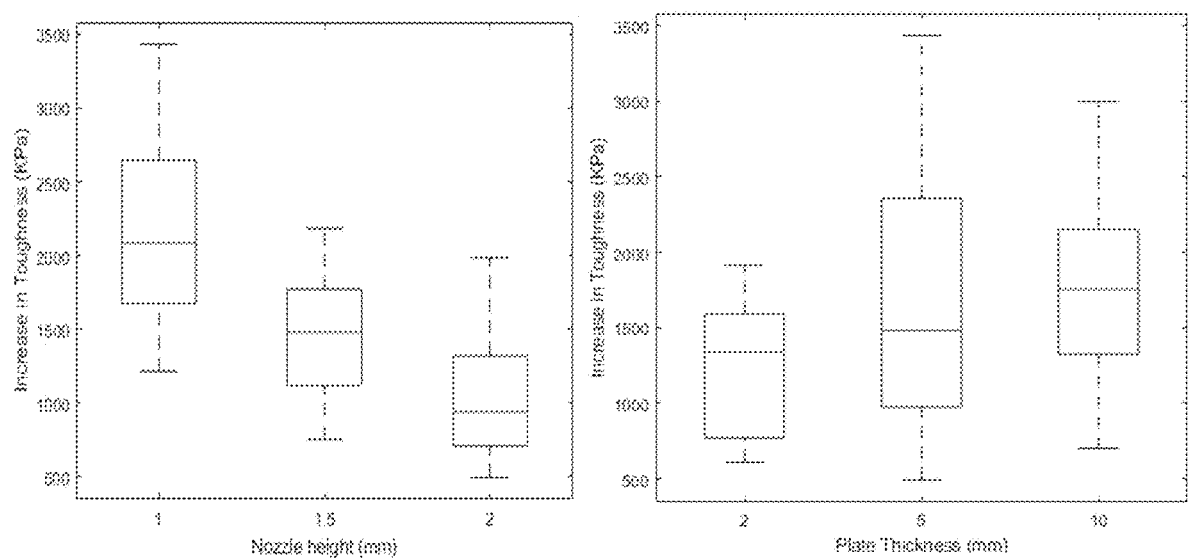
FIG. 17 shows a boxplot of variance in the distribution of increase in toughness for different nozzle heights and a boxplot of variance in the distribution of increase in toughness for different nozzle heights plate thickness.

The boxplots in FIG. 17 show that increase in toughness has a larger spread for plate thickness as compared to nozzle height showing a dominant effect of the nozzle height. Also, there is a positive correlation between increase in plate thickness with the increase in toughness and a negative correlation between increase in nozzle height and increase in toughness.

Two-Way Fixed Effects Model and Assumptions Verification

In the current experiment for both response variables, the two-factor full interaction model is given as, $$Y_{ijt} = \mu \ldots \alpha_i + \beta_j + (\alpha\beta)_{ij} + \varepsilon_{ijt} \quad [1]$$

Figure 18:
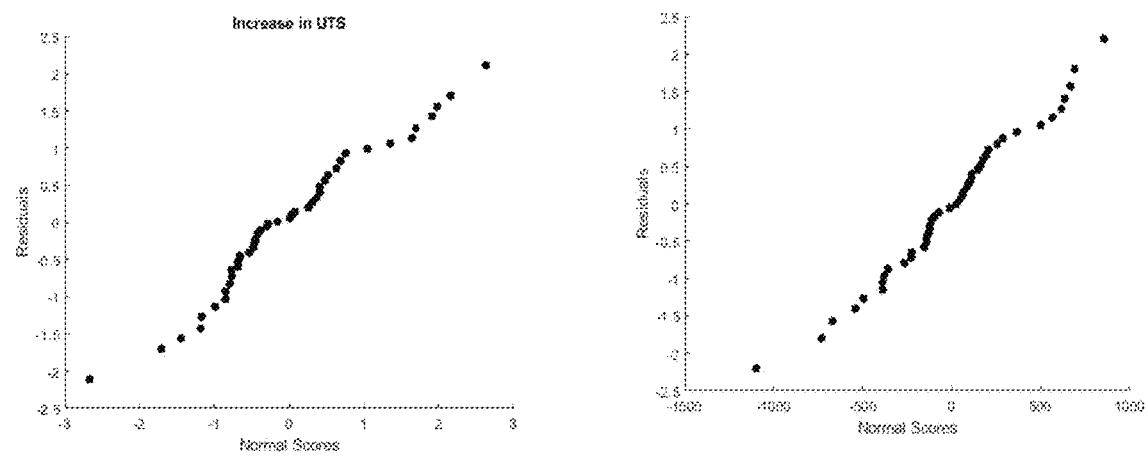
FIG. 18 shows a normal probability plot for both response variables.

Here it is assumed that the model has unknown fixed effects subjected to the following restrictions:

$\Sigma_i(\alpha)_i = 0$, $\Sigma_j(\beta)_j = 0$, $\Sigma_i(\alpha\beta)_{ij} = 0$ and $\Sigma_i(\alpha\beta)_{ij} = 0$. Also, it is assumed that the error term in the ANOVA model, $\varepsilon_{ijt}$, Is normally distributed with constant variance and mutually independent errors. The assumption of normally distributed residuals is done by visually inspecting the Normal Probability Plot (NPP) for both responses as shown in FIG. 18. Both the plots have some sampling variations but lack of any heavy tails and no serious departures from normality. Therefore, the assumption of normality is satisfied for both response variables. As normality is satisfied, a transformation does not need to be applied to the data.

Figure 19:
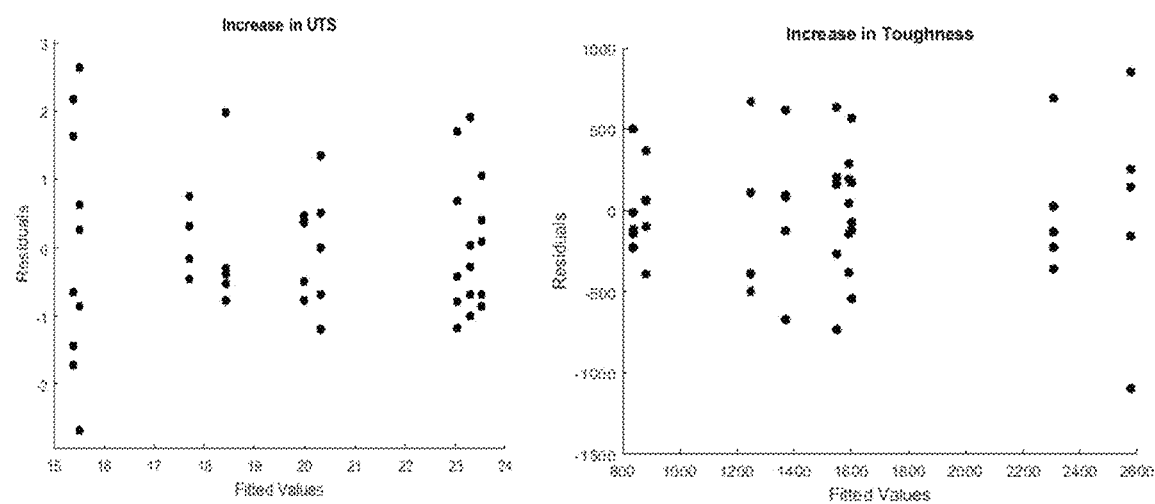
FIG. 19 shows a plot of residuals against fitted values.

Then, the assumption of constant variance was checked. To check for this assumption, the residuals were plotted as a function of fitted values (estimated means, ŷ) as shown in FIG. 19. From FIG. 19, for both response variables (Increase in UTS and Increase in toughness), there were no collocated residuals, and the scatter of points were randomly distributed with a somewhat equal spread. Therefore, the assumption of constant variance is satisfied.

ANOVA and Factor Interactions a) Increase in UTS

Figure 20:
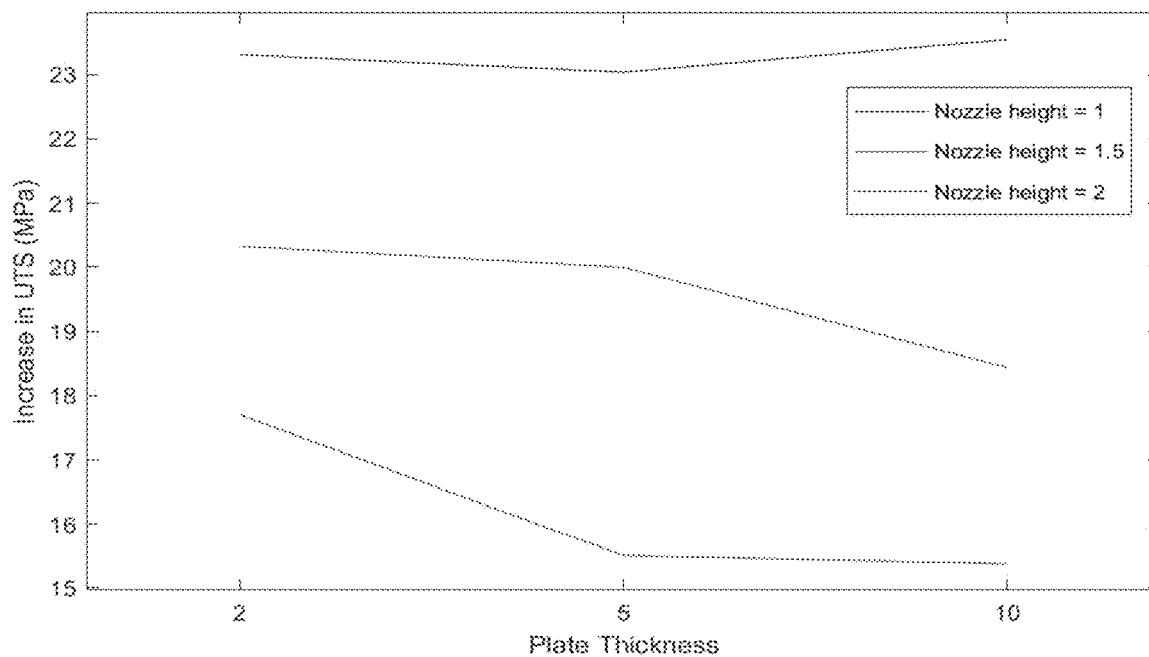
FIG. 20 shows an interaction plot for increase in UTS.

From the interaction plots shown in FIG. 20, three distinct lines are seen which shows that the main effects for the nozzle heights are present. With an increase in nozzle height, the average increase in UTS falls indicating that for 1 mm nozzle height, the is a maximum increase in UTS. A fall in the average increase in UTS is seen for 2 mm plate thickness to 5 mm plate thickness for 2 mm nozzle height, but this can be attributed to the presence of sampling variability. The three distinct lines show a slight fall in average increase in UTS for the 5 mm plate thickness plate, but the overall trend is to remain constant with zero slope thus indicating the absence of main effects due to plate thickness which can be further verified from the ANOVA results shown in Table 2.

TABLE 2

ANOVA for the Increase in UTS

| Source | Degrees of Freedom | Type III Sums of Squares | Mean Square | F value | Pr > F |
|---|---|---|---|---|---|
| Nozzle Height (h) | 2 | 378.24 | 189.12 | 129.17 | <.0001 |
| Plate thickness (t) | 2 | 13.93 | 6.97 | 4.76 | 0.0147 |
| h × t | 4 | 13.97 | 3.49 | 2.38 | 0.0694 |
| Error | 36 | 52.71 | 1.46 | | |
| Corrected Total | 44 | 458.85 | | | |

The ANOVA results show the breakdown of the variability (sums of squares) of the response variable, increase in UTS. Nozzle height has the maximum contribution to the variability, and 89% of the variability in the response can be explained by the full interaction model. The ANOVA results also show, for the interaction effects, the p-value (0.0694) >0.01 (confidence level of 99%). Thus, it can be concluded that the interaction effects are negligible. Due to the absence of interaction effects, the main effects due to the plate thickness and nozzle height were then checked. The p-value for the plate thickness (t) (0.0147)>0.01 (confidence level of 99%), thus indicating the absence of main effects due to plate thickness. The absence of interaction effects and main effects due to plate thickness on the increase in UTS show that another appropriate model is the additive model, $$Y_{ijt} = \mu \ldots + \alpha_i + \varepsilon_{ijt}, \quad [2]$$

The above model has the assumptions that $\Sigma_i(\alpha)_i = 0$, where $\alpha_i$=main effects due to nozzle height, $\mu \ldots$ =overall mean for all treatments and $\varepsilon_{ijt}$=error term.

b) Increase in Toughness

Figure 21:
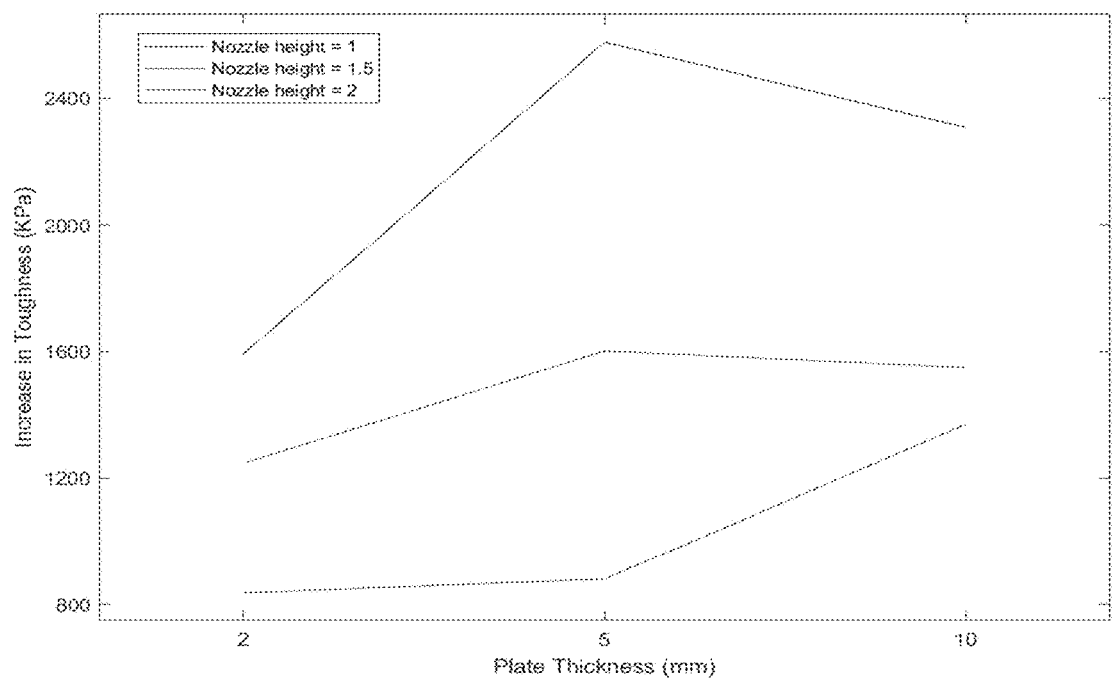
FIG. 21 shows an interaction plot for increase in Toughness.

From the interaction plot for increase in toughness shown in FIG. 21, three distinct lines are seen and correspond to the nozzle heights, indicating the presence of main effects due to the nozzle heights. As nozzle height increases, there is a drastic fall in the average increase in toughness of the specimen. Unlike the previously studied response (increase in UTS) in the current response, an overall positive correlation of average increase in toughness with plate thickness is shown. The non-zero slopes of the lines indicate the presence of main effects due to plate thickness. The lines show similar trends, indicating that the interaction effects between nozzle height and plate thickness are not important. The above inferences were further verified from the ANOVA results obtained in Table 3.

TABLE 3

ANOVA for the Increase in Toughness

| Source | Degrees of Freedom | Type III Sums of Squares | Mean Square | F value | Pr > F |
|---|---|---|---|---|---|
| Nozzle Height (h) | 2 | 9736406.44 | 4868203.2 | 24.65 | <.0001 |
| Plate thickness (t) | 2 | 2420682.15 | 1210341.073 | 6.13 | 0.0051 |
| h × t | 4 | 1421927.11 | 355481.78 | 1.80 | 0.1502 |
| Error | 36 | 7108455.87 | 197457.11 | | |
| Corrected Total | 44 | 20687471.57 | | | |

The ANOVA show that the nozzle height has the maximum contribution to the sums of squares. It is also shown that for the interaction effects the p-value (0.1502)>0.01 (confidence level of 99%) which confirms our inference from the interaction plots that the interaction effects are not important. But on comparing the p-value for the main effects due to nozzle height and plate thickness it is shown that these main effects are present for a confidence level of 99%. Due to the absence of interaction effects, for future work the appropriate model is an additive model, $$Y_{ijt} = \mu \ldots + \alpha_i + \beta_j \varepsilon_{ijt},  \quad [3]$$

with the assumptions that $$\sum_i i(\alpha)_i = 0 \text{ and } \sum_j (\beta)_j = 0,$$

where $\alpha_i$=main effects due to nozzle height, $\beta_j$=main effects due to plate thickness, $\mu \ldots$ =overall mean for all treatments and $\varepsilon_{ijt}$=error variable. But for the present study, the fitted full interaction model as given in Equation (1) is used.

Pairwise Comparisons

Figure 22:
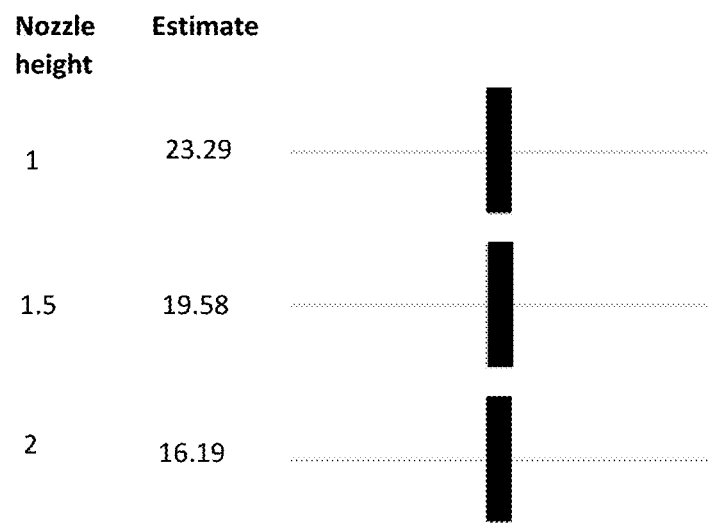
FIG. 22 shows a line plot for Tukey's Pairwise comparison for increase in UTS.

A Tukey's pairwise comparison was done for both the response variables to obtain the significant factor levels at a 95% confidence level. This analysis of factor effects recognized how the factor levels are statistically different from one another. For increase in UTS only main effects due to nozzle height were present, thus a Tukey's pairwise comparison was done for different levels of nozzle height as shown in FIG. 22. The vertical lines were used to connect two factor levels that are not statistically different. All three nozzle heights have mean differences in the increase in UTS that are statistically different from each other. This suggested that as nozzle height is reduced from 2 mm to 1.5 mm to 1 mm progressively higher increases in UTS can be achieved.

Figure 23:
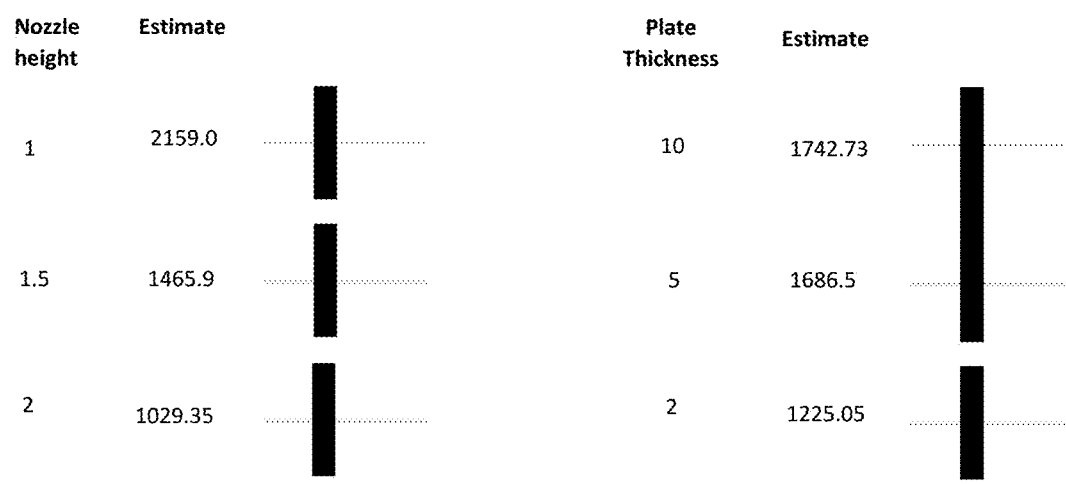
FIG. 23 shows a line plot for Tukey's Pairwise comparison for increase in toughness with nozzle height and a line plot for Tukey's Pairwise comparison for increase in toughness with plate thickness.

For the increase in toughness, there are two main effects namely, main effects due to nozzle height and main effects due to plate thickness. FIG. 23 shows the line plots using Tukey's pairwise comparisons for the both the main effects. The line plot for nozzle heights shows that the three levels have mean differences in increase in toughness that are statistically different from each other. This implies that as nozzle height is reduced from 1 mm to 1.5 mm to 2 mm, there is a progressively higher increase in toughness. From the line plot for plate thickness, it is shown that the mean differences in increase in toughness for the 5 mm and 10 mm plates are not statistically different. However, the 2 mm plate has mean differences which are statistically different from the 5 mm plate. This indicates that as the plate thickness is increased from 2 mm to 5 mm, there is a higher increase in toughness. But between the 5 mm plate and 10 mm plate, the increase in toughness is not significant. Thus, maximum increase in toughness can be achieved for a 5 mm plate or 10 mm plate with 1 mm nozzle height.

Optimized Design of Heater Block Assembly

Figure 24:
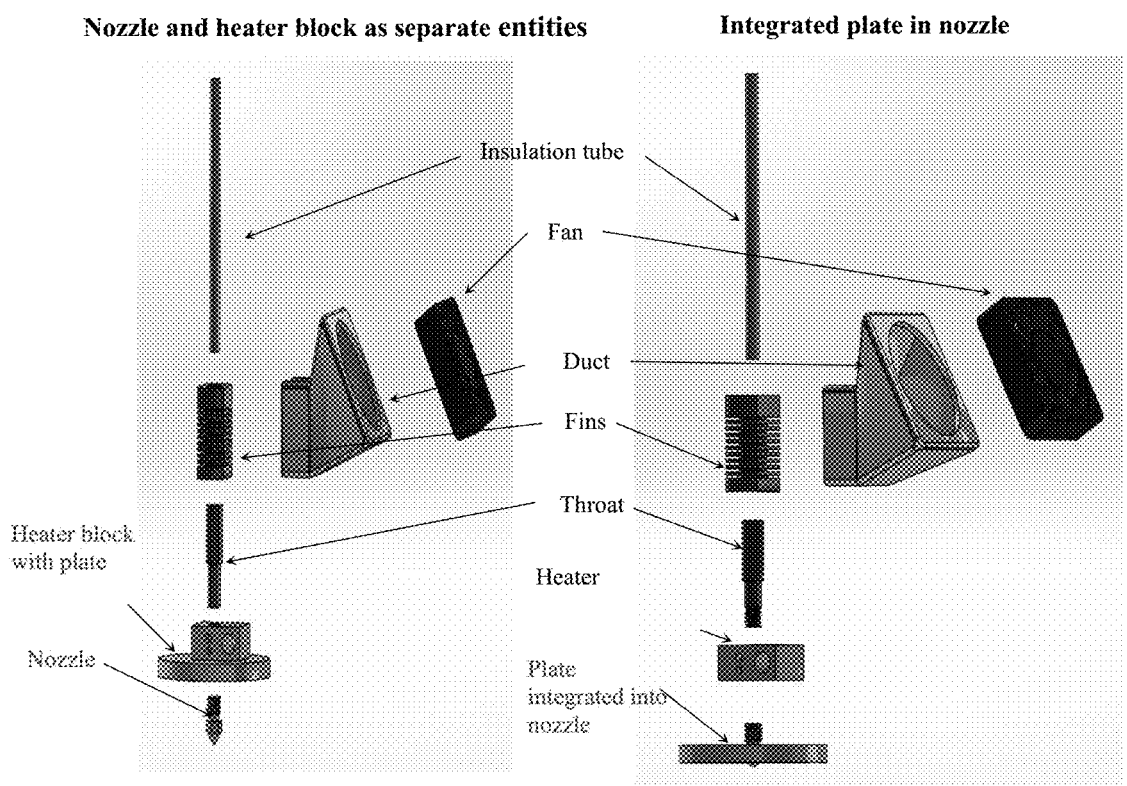
FIG. 24 shows two implementations of the fused filament fabrication print head system.
Figure 25:
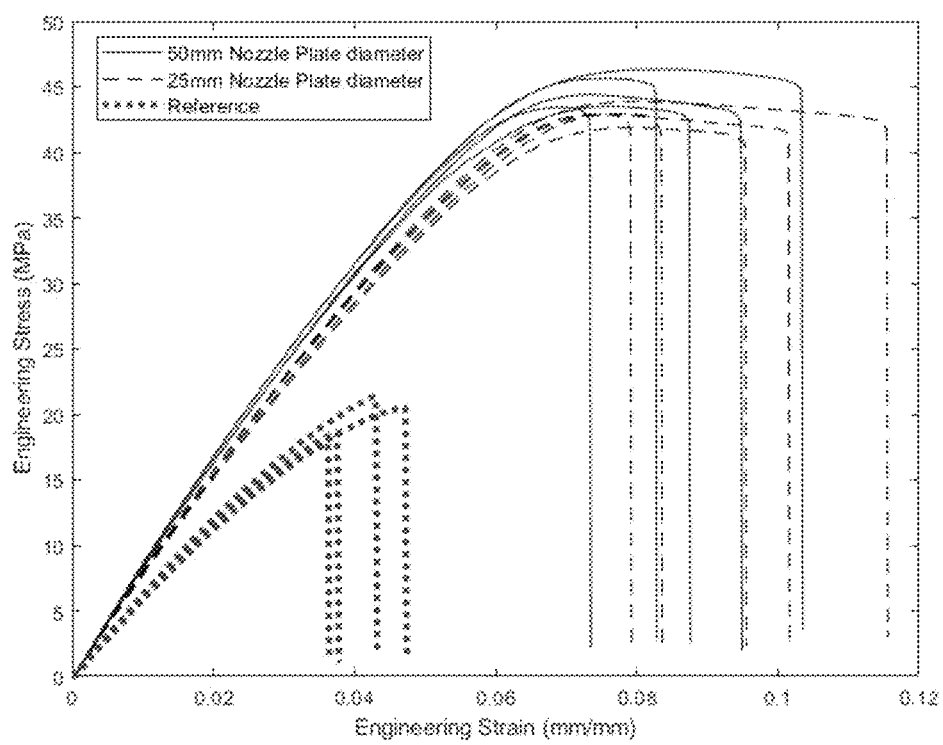
FIG. 25 shows stress-strain plots for specimens printed using the fused filament fabrication print head system.

Based on the Tukey's pairwise comparison, it is seen that the optimized parameters for maximum UTS and toughness were 1 mm nozzle height and 5 mm plate thickness. Based on these parameters, a nozzle with an integrated plate was designed as shown in FIG. 24. The 5 mm plate thickness was chosen instead of the 10 mm plate because Tukey's pairwise comparison shows that the two are not statistically different (in terms of increase in average UTS and toughness), also the 5 mm plate is lighter in weight, reducing the inertia during rapid movements due to lower mass, and it reaches the desired temperature in a shorter duration of time. Two nozzles were fabricated, one with a 25 mm plate diameter and the other with a 50 mm plate diameter. In some implementations, the heater block (with the plate) and the nozzle are separate parts that are assembled as shown in the left of FIG. 24. In the implementation on the right of FIG. 24, the plate was integrated into the nozzle thus the nozzle could be hand tightened or loosened into the heater block and reduces the assembly time if the nozzle clogged. Five specimens were printed using each nozzle and it was observed that their effect on UTS and toughness was similar to that of the previous design with 1 mm nozzle height and 5 mm plate thickness as seen from the stress-strain plots in FIG. 25. The plate diameter does not show a significant effect on either the UTS or toughness, this is because the printed specimens are always under the plate and are exposed to similar temperature fields for both plate diameters. Table 4 shows the increase in average UTS and toughness for the implementation on the right of FIG. 24.

TABLE 4

Percentage increase in average UTS and Toughness with optimized heater block assembly

| Levels | Integrated Nozzle Plate diameter (mm) | Percentage increase in the average ultimate tensile strength (%) | Percentage increase in the average toughness (%) |
|---|---|---|---|
| 1 | 25 | 119.3 | 501.1 |
| 2 | 50 | 128.3 | 473.6 |

The ANOVA results show that for the response variable, increase in UTS, only main effects due to nozzle height are present. The maximum value for increase in UTS was achieved for the 1 mm nozzle height which means that as the nozzle height is reduced from 2 mm to 1 mm, the increase in average UTS keeps going up. For a nozzle height of 2 mm, there is an increase in average UTS from the reference specimen, but this increase is maximized for the 1 mm nozzle height.

The ANOVA results for the second response variable (increase in Toughness) show that the main effects due to both the nozzle height and plate thickness are present. There is a negative correlation of the average increase in toughness with the nozzle height, which is similar to the previous results. A decrease in nozzle height shows higher values of increase in average toughness, which signifies that for the 2 mm nozzle height there is an increase in toughness, but this average increase is maximized for the 1 mm nozzle height. With a change in the plate thickness, it is shown that the increase in average toughness goes up as the plate becomes thicker from 2 mm to 5 mm to 10 mm. However, the Tukey's line plots suggest that the mean differences between the 5 mm plate and 10 mm plate are not statistically significant. Thus, one could choose a 5 mm plate to achieve highest average increase in toughness. In some implementations, a 5 mm plate would be advantageous because it heats up much faster than the 10 mm plate and reduces the inertia effects due to mass which lead to decreased geometric accuracy while fabricating the specimen. In this experiment, a nozzle height of 1 mm and plate thickness of 5 mm provided the best results for increased in average UTS (118.6%) and increase in average toughness (558.6%). The increase in average UTS and average toughness have been summarized in Table 5 for all factor level combinations.

TABLE 5

Percentage increase in average UTS and Toughness for different factor level combinations

| Levels | Plate thickness (mm) | Nozzle height (mm) | Percentage increase in the average ultimate tensile strength (%) | Percentage increase in the average toughness (%) |
|---|---|---|---|---|
| 1 | 2 | 1 | 120.0 | 344.9 |
| 2 | 2 | 1.5 | 104.6 | 270.3 |
| 3 | 2 | 2 | 91.2 | 181.3 |
| 4 | 5 | 1 | 118.6 | 558.6 |
| 5 | 5 | 1.5 | 102.9 | 347.1 |
| 6 | 5 | 2 | 79.8 | 190.9 |
| 7 | 10 | 1 | 121.2 | 500.3 |
| 8 | 10 | 1.5 | 94.9 | 335.7 |
| 9 | 10 | 2 | 79.2 | 297.1 |

Figure 26:
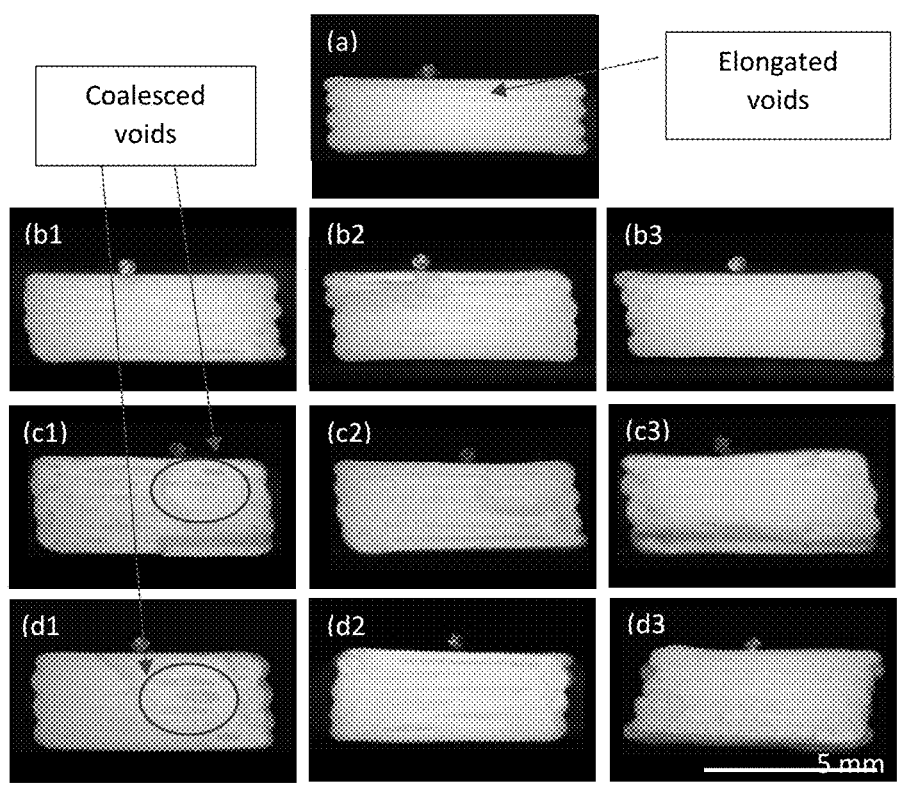
FIG. 26 shows (a) Cross-section of a reference coupon. (b1)-(b3) Cross-section of a coupon printed with 2mm block with nozzle height of 1 mm, 1.5 mm, and 2 mm, respectively. Similarly, (c1)-(c3) and (d1)-(d3) are representative cross-sections of specimens printed with 5 mm and 10 mm blocks with nozzle heights of 1 mm, 1.5 mm, and 2 mm. All cross-sections are normal to raster direction.
Figure 27:
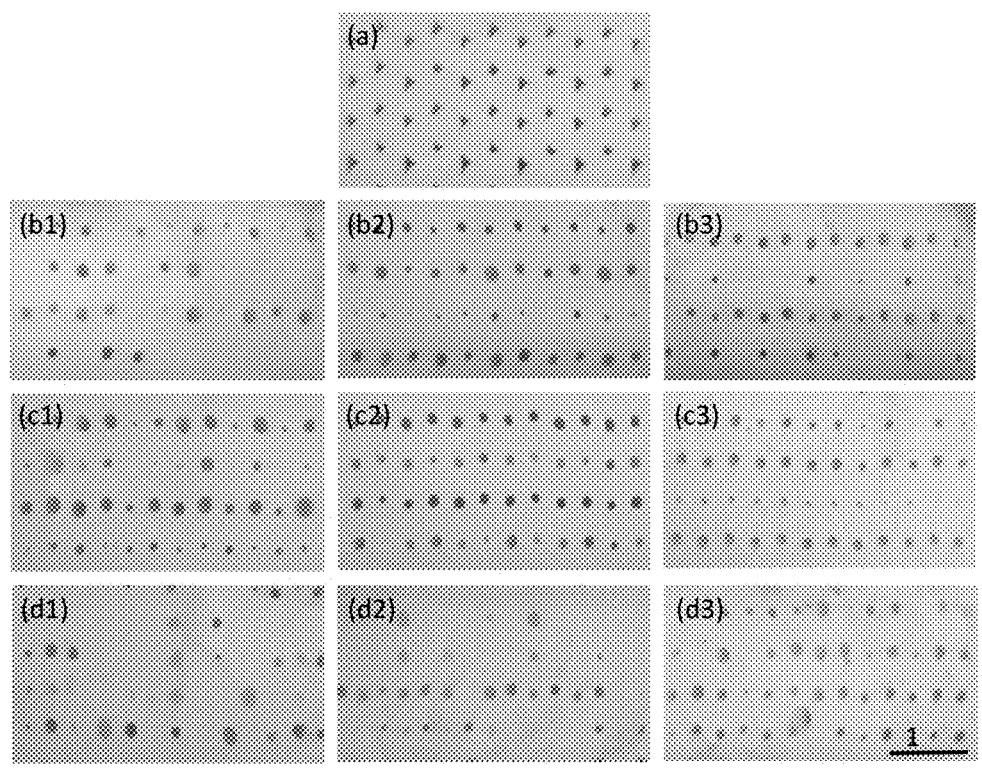
FIG. 27 shows (a) Cross-section of a reference coupon. (b1)-(b3) Cross-section of a coupons printed with 2 mm block with nozzle height of 1 mm, 1.5 mm, and 2 mm, respectively. Similarly, (c1)-(c3) and (d1)-(f4) are representative cross-sections of specimens printed with 5 mm and 10 mm blocks with nozzle heights of 1 mm, 1.5 mm, and 2 mm. All cross-sections are normal to build direction.

The increase in UTS can also be characterized by looking at the cross-sectional images as seen in FIG. 26 and FIG. 27. FIG. 26 shows the cross-sectional images of the failed surface for the reference and the different treatment combinations. It is seen that for the reference surface elongated voids are present between adjacent rasters. These elongated voids reduce the bond area and act as failure initiation zones leading to low values of UTS in the reference specimen. No noticeable change in the voids is seen as the plate thickness changes from 2 mm to 10 mm. But as one moves from a nozzle height of 2 mm to 1 mm the voids coalesce together as shown in FIG. 26. This leads to an increased bond area between layers and reduces the failure initiation zones thus increasing the UTS as the nozzle height is reduced to 1 mm. Also, during testing of the parts crazing is noticed on the parts that are printed using the disclosed fused filament fabrication print head system which indicates a shift from laminar behavior towards homogeneity.

FIG. 27 shows the changes in the void shapes and bond length for the different treatment combinations. It is seen that for the reference specimen, there are equally spaced diamond-shaped voids. But on studying the cross-sections of the specimen on which treatment combinations were applied, it is shown that the void shape changes from diamond to a circular void. Similar changes in void shapes have been seen in previous studies with post-process annealing thus indicating an analogous effect that takes place here. These diamond-shaped voids have sharp edges which act as stress concentration points leading to accentuating the premature failure of the reference specimen, but a shift towards circular voids reduces the stress intensity factor thus leading to a further increase in the strength of the parts when in-situ annealing is applied. Also, for the 1 mm nozzle height void, it is shown that migration takes place indicating that it is exposed to a higher temperature field as explained by the simulation results. Also, as the plate thickness increases to 10 mm not only is a shift in the regular pattern of the voids seen, but also the void coalescence leads to larger voids which are less in number.

Figure 28:
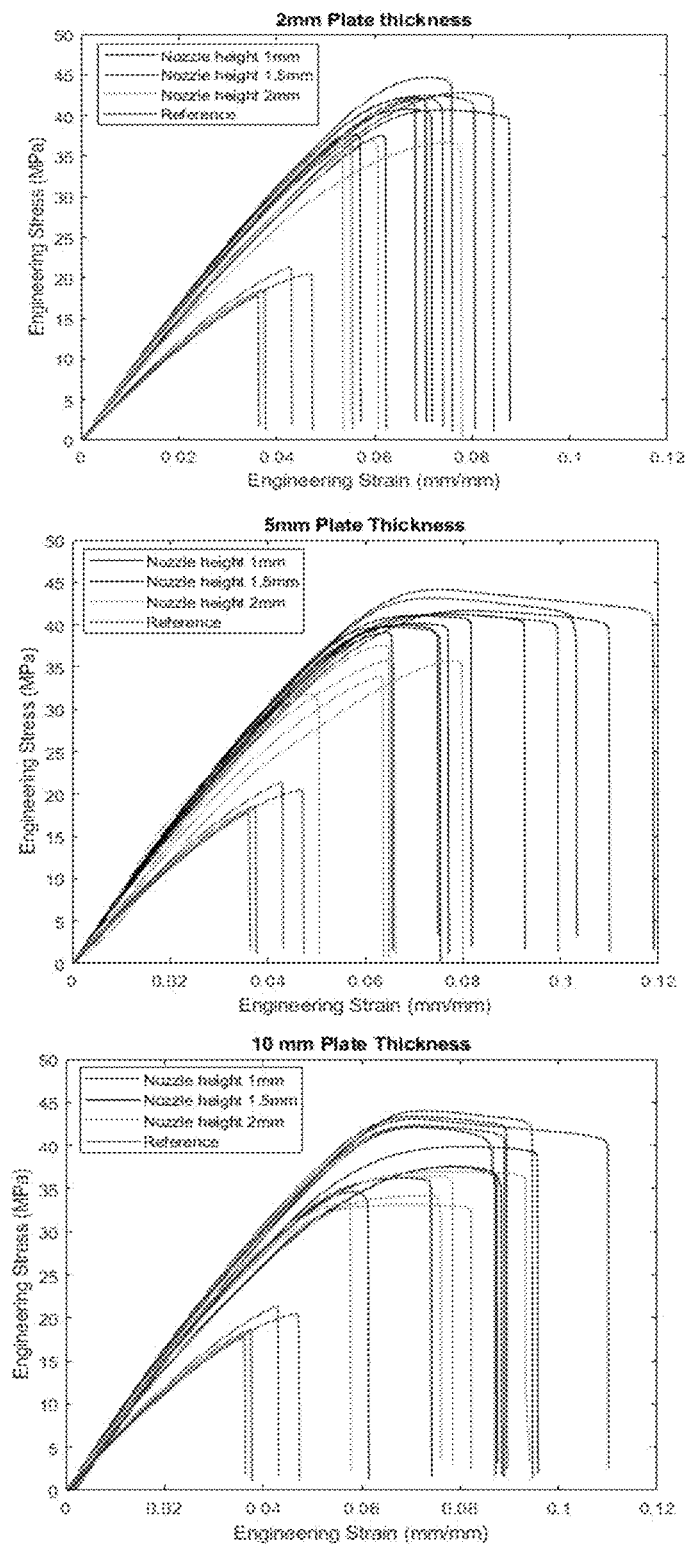
FIG. 28 shows stress-strain curves for specimens fabricated using different plate thicknesses and nozzle heights.

FIG. 28 shows the stress-strain plots for different factor level combinations. The parts printed with the disclosed fused filament fabrication print head system show enhanced stiffness (increased Young's Modulus) as compared to the reference values. Also, the failure mode of the specimen shifts from a brittle (reference specimen) to a more elastic-brittle failure when fabricated using the fused filament fabrication print head system. In the study ductility and toughness show positive correlation with each other. An increase in ductility is seen with a decrease in nozzle height and an increase in the plate thickness. The stress strain plots for the 5 mm plate and 10 mm plate show similar behavior with a noticeable brittle elastic failure at the 1 mm and 1.5 mm nozzle height. For the 2 mm plate, enhanced stiffness and UTS are shown, but the failure is more brittle as compared to the other two plates.

Another important inference that can be concluded from the stress-strain plots is that there is a change in the elastic modulus of the parts (considering only the Hookean region). For different plate thicknesses and nozzle heights, it is seen that the increase change in Young's modulus remains fairly constant with an average of 2144.4 ±135.2 Mpa. The treated parts Table 6 shows the average Young's modulus for the reference and the average Young's modulus of the parts printed using the novel print head.

TABLE 6

Young's Modulus of reference and treated parts as compared with bulk material

| | Young's Modulus (Mpa) | Compared to bulk material |
|---|---|---|
| Reference | 1651.8 ± 48.72 | 45% |
| Novel Print head | 2144.4 ± 135.2 (77% increase) | 60% |

In this experiment, a fused filament fabrication print head system was utilized to increase the UTS and toughness of FFF parts. The experiments were chosen to characterize the effect of the nozzle height and plate thickness on the two response variables (increase in average UTS and toughness). In the 2-way full factorial design of experiments, 3 factor levels were chosen for each, the nozzle height and plate thickness. The specimens were tested under a tensile load to obtain the UTS and the area under the stress-strain curve was calculated to get the toughness. The ANOVA results revealed the lack of interaction effects between nozzle height and plate thickness for both response variables. Only main effects due to nozzle height were present for increase in UTS whereas for increase in toughness both main effects due to nozzle height and plate thickness were present (99% significance level). A finite volume simulations model was run to calculate the temperature field around the heater block assembly, this model helps to explain the effect of the nozzle height and plate thickness on the response variables. From Tukey's pairwise comparison it was shown that the optimized factor levels for maximum increase in UTS and toughness are: 1 mm nozzle height and 5 mm plate thickness. For 1 mm nozzle height and 5 mm plate thickness, an increase in average UTS of 118.61% and an increase in average toughness of 257.8% was seen. In some implementations, the system includes an integrated heater plate instead of a separate heater block and nozzle. Two diameters of nozzle integrated heater plates, 25 mm, and 50 mm, were used to print 5 specimens each. An average increase in Young's modulus by 77% of the specimens was seen as compared to the reference when the fused filament fabrication print head system is used. The experiment done in this disclosure provides the basis and understanding to the in-situ annealing process that occurs while using the disclosed fused filament fabrication print head system. The fused filament fabrication print head system provides a simple and elegant solution to print geometrically accurate parts with superior mechanical properties to improve mechanical strength at a fraction of the cost as that of other complicated heater block designs.

Example 2: Testing and Experimental Results

Experimental Characterization of Enhanced Fused Filament Fabricated Tall Thin-Walled Structures Using Polylactic Acid (PLA)

Printing thin-walled structures with good mechanical properties and geometric accuracy using Fused Filament Fabrication (FFF) may be challenging with traditional methods due to weak layer-to-layer bonding Therefore, another experiment was conducted wherein thin-walled structures were printed and tested using an example nozzle print head (e.g., the print head shown in FIG. 2).

Experiments—Additive Manufacturing Platform

Figure 34:
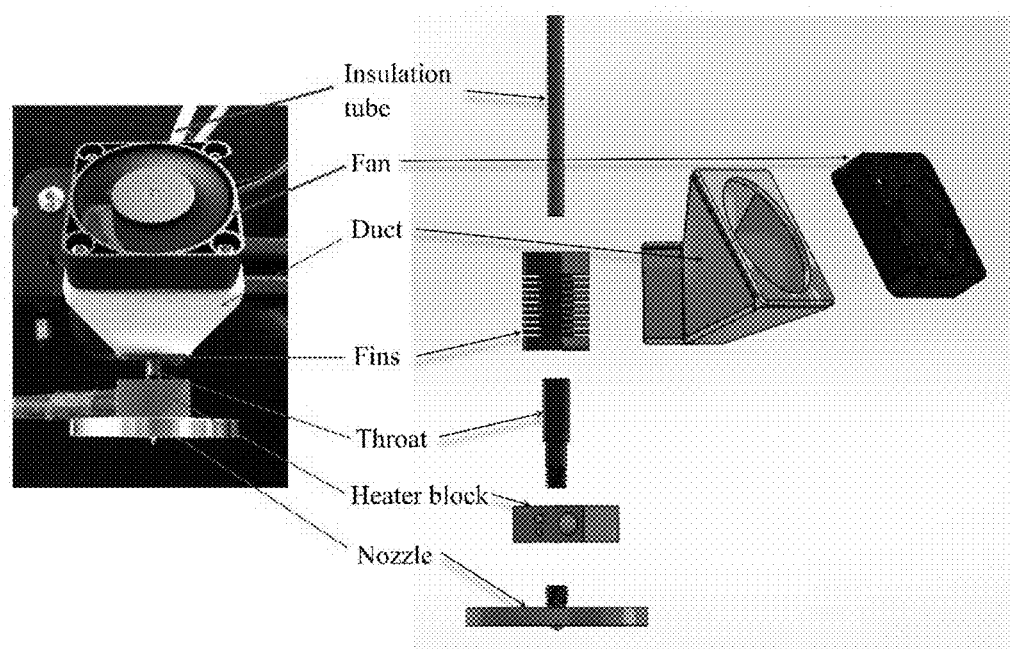
FIG. 34 depicts the setup of the printer of this experiment, similar to the printer shown in FIG. 30 and FIG. 2, with corresponding elements labeled accordingly.

FIG. 34 depicts the setup of the printer of this experiment, similar to the printer shown in FIG. 30 and FIG. 2, with corresponding elements labeled accordingly. In the experiment, a Creality Ender pro-3D printer was set up with an example novel print head to perform the controlled experiment. The print head has an additional component in terms of a heater plate in comparison to a standard print head on a 3D printer. The heater plate has a thickness of 2 mm, a diameter of 50 mm, and a nozzle height of 1 mm. Nozzle height is the distance between the top of the nozzle to the bottom of the heater plate.

Print Geometry and Parameters

Figure 35:
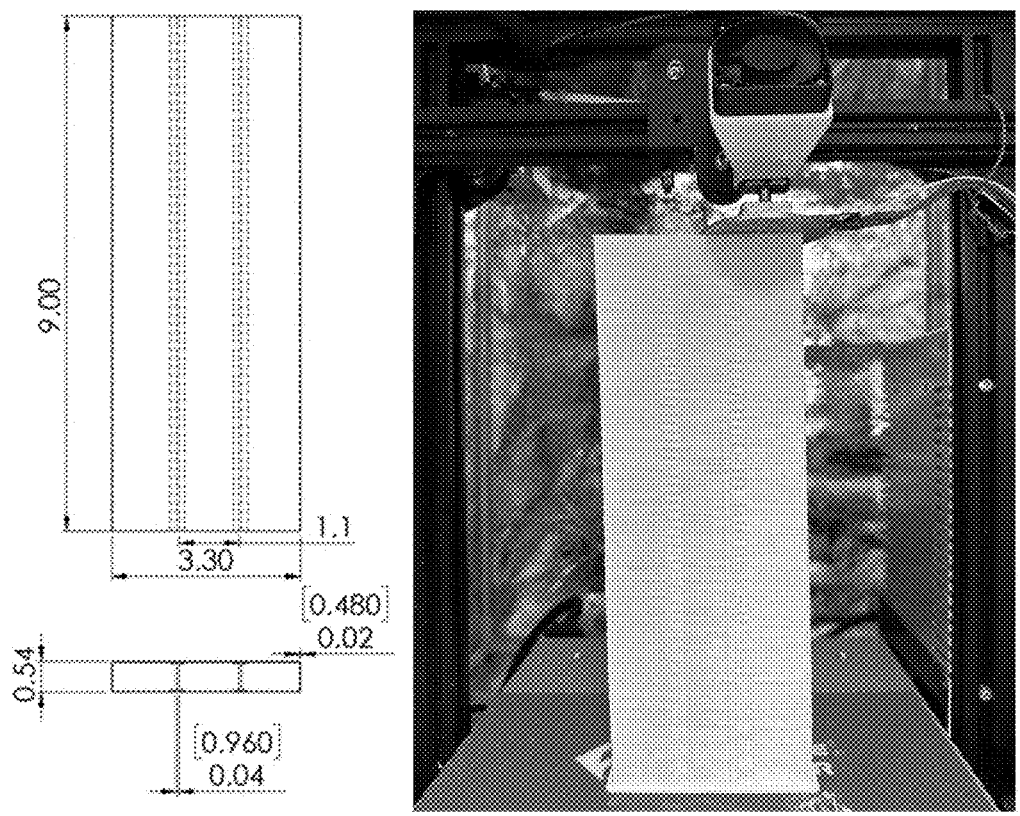
FIG. 35 shows a design of a tall-thin wall sample which has a single bead as an outline with two I-beams equally spaced, and, on the right, an image of the part being printed with the example novel print head, according to one implementation.

A unique geometry was designed to evaluate the bending strength of printed parts. ASTM standard for the 3-point bend test recommends a rectangular sample of 127 mm×15 mm×2 mm to get bending strength, but such structures are not representative of an actual tall thin wall part geometry. Furthermore, to evaluate the effect of novel print head on the designs that are larger than the diameter of the heater plate (in this case 50 mm), ASTM sample size does not meet the criteria especially when printed upward in the direction of length (in this case 127 mm). Hence a novel structure of 9×3.30×0.54 inch with a single bead wall of 0.48 mm as shown in FIG. 35 was designed and printed. Specifically, FIG. 35 shows a design of a tall-thin wall sample which has a single bead as an outline with two I-beams equally spaced, and, on the right, an image of the part being printed with the example novel print head.

Five samples each were printed using a standard Creality Ender-3 3D printer and a Creality Ender-3 3D printer with the novel print head using Poly Lactic Acid (PLA) filament from HatchBox. A raft layer was printed for the sample to attach to the print bed and avoid parts coming off during printing which is a common issue for thin wall parts. Print parameters used for printing samples on each setup were selected based on the previous research except print speed to achieve the highest mechanical properties while trying to maintain geometrical accuracy. Print parameters used are as follows: Nozzle diameter 0.40 mm; Bead width 0.48 mm; Nozzle/Heater plate temperature 210° C.; Print bed temperature 60° C. The print speed with novel-print head was selected to be 600 mm/min based on initial experiments for highest strength, while 1250 mm/min was selected for standard printing for highest strength and maintaining visible geometrical accuracies.

FARO arm scanner was used to scan the samples and generate point cloud data. The point cloud data was later compared with CAD model using PolyWorks software for geometrical deviations and dimensional measurements of overall length, width, and height.

Figure 36:
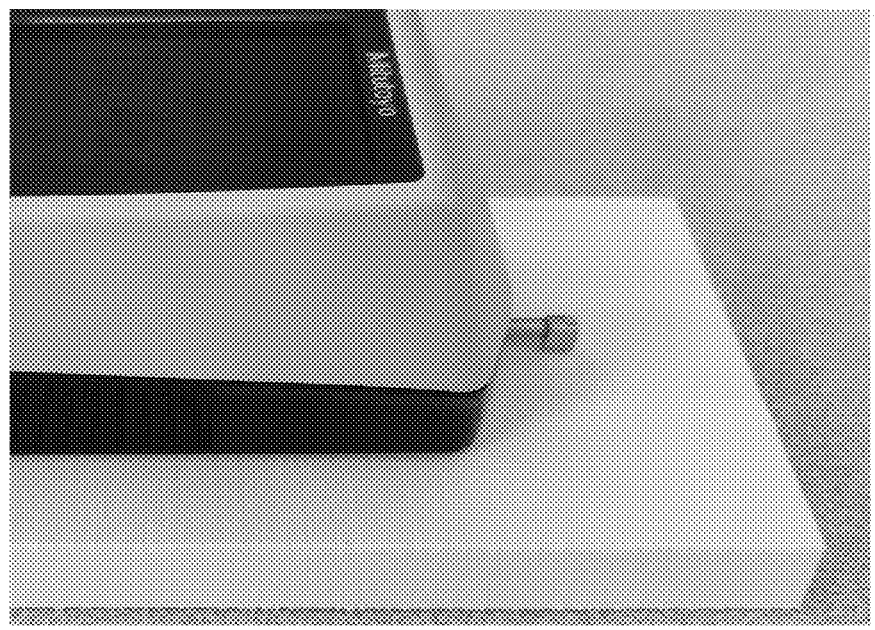
FIG. 36 shows an image of a Mitutoyo SJ210 used to measure the surface roughness (Ra) at five random locations for an experimental sample, according to one implementation.

Mitutoyo SJ210 was used to measure the surface roughness (Ra) at five random locations for each sample and an average value is being reported here for each sample, as shown in FIG. 36. Gaussian filter is used with a stroke length of 2.5 mm for each surface roughness measurement to get the value of absolute mean surface roughness (Ra). ISO 21290 was followed for these measurements.

Mechanical Testing and Mathematical Calculations

Figure 37:
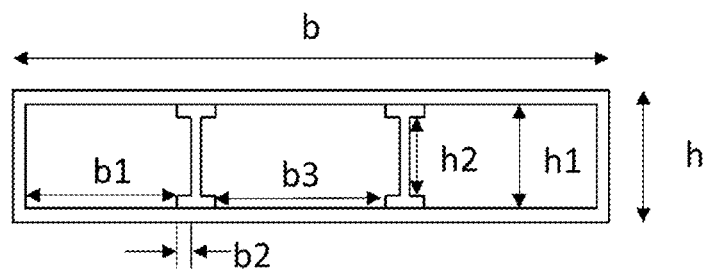
FIG. 37 shows an example cross-section of an experimental section used to calculate the moment of inertia, according to one implementation.
Figure 38:
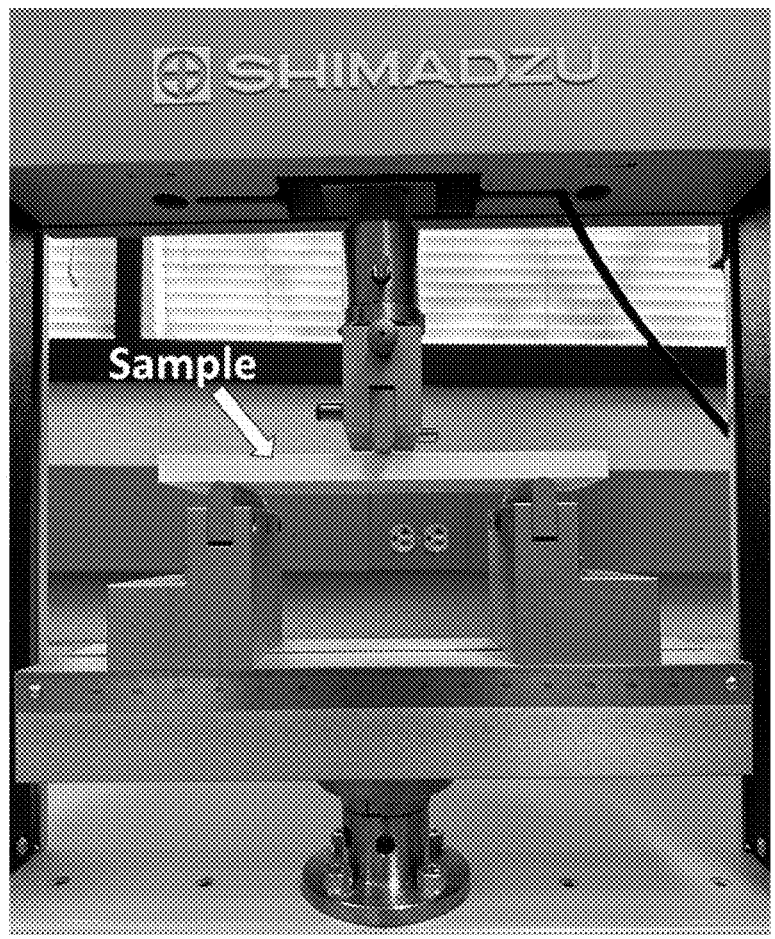
FIG. 38 shows the setup for the 3-point bend test performed with Shimadzu equipment at 0.2 in/in test speed, according to one implementation.

A 3-point bend test was carried out according to ASTM D790-17 with a span length of 8 inch and a testing speed of 0.2 in/minute to get force and displacement data. The moment of inertia is calculated based on the cross-section of the sample as shown in FIG. 37. The 3-point bend test was performed with Shimadzu equipment at 0.2in/in test speed, the setup of which is shown in FIG. 38. The maximum strength and strain values are calculated using equations 4-6 below.

$$\text{Moment of Inertia}, I = \frac{bh^3}{12} - \frac{2b_1 h_1^3}{12} - \frac{4b_2 h_2^3}{12} - \frac{b_3 h_1^3}{12} \ldots \quad [4]$$

$$\text{Stress}, \sigma = \frac{FLh}{8I} \ldots \quad [5]$$

$$\text{Strain}, \varepsilon = \frac{\sigma}{E_{flex}} \ldots \quad [6]$$

Here $E_{flex}$ = Flexural Modulus

Results and Discussion

Overall, the samples printed with the novel print head showed no visible deformation or warping. As detailed below, the results demonstrate that providing additional in-situ thermal energy more than doubles the bending strength while maintaining or exceeding geometrical accuracy and surface finish, compared to a standard specimen. These results demonstrate the potential for printing effective thin-walled components using this technique to meet practical strength requirements in a variety of applications.

Geometrical Accuracy

The geometrical measurements using PolyWorks software reveal an average deviation in length, width, and thickness of the structure is no more than 1 mm. The results are shown in Tables 7, 8, and 9 below where the CAD value represents the value of the parameter in the design file.

TABLE 7

Table of Standard vs Enhanced Samples for Dimensional Measurements.

| | Length (mm) | | |
|---|---|---|---|
| Index | CAD | Standard | Enhanced |
| 1 | 228.60 | 228.90 | 228.46 |
| 2 | | 228.57 | 227.40 |
| 3 | | 228.84 | 227.59 |
| 4 | | 229.12 | 227.656 |
| 5 | | 228.66 | 227.80 |

TABLE 8

Table of Standard vs Enhanced Samples for Dimensional Measurements.

| | | Thickness (mm) | |
|---|---|---|---|
| Index | CAD | Standard | Enhanced |
| 1 | 12.7 | 13.155 | 12.917 |
| 2 | | 13.013 | 12.788 |
| 3 | | 12.93 | 12.848 |
| 4 | | 12.982 | 12.782 |
| 5 | | 12.882 | 12.864 |

TABLE 9

Table of Standard vs Enhanced Samples for Dimensional Measurements.

| | | Width (mm) | |
|---|---|---|---|
| Index | CAD | Standard | Enhanced |
| 1 | 82.86 | 83.342 | 83.004 |
| 2 | | 83.096 | 82.875 |
| 3 | | 83.607 | 82.696 |
| 4 | | 83.632 | 82.978 |
| 5 | | 83.424 | 82.779 |

Figure 39:
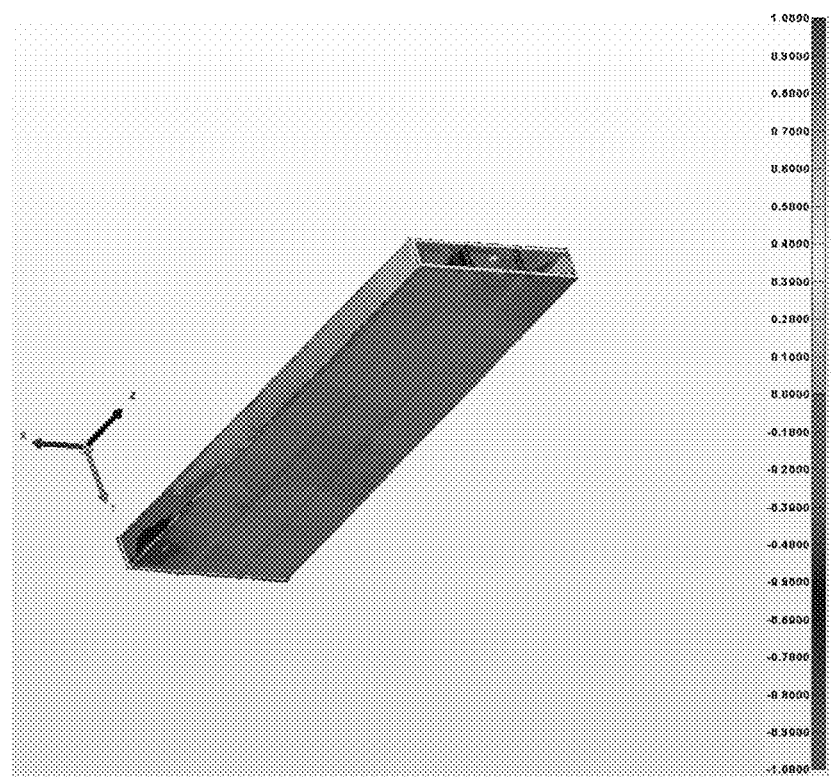
FIG. 39 shows a geometrical deviation plot for a sample printed with a novel print head, according to one implementation.

Additionally, geometrical deviation plots indicate no extensive deformation or shrinkage through all parts. For example, FIG. 39 shows a geometrical deviation plot for a sample printed with a novel print head. The scale bar 1 to −1 represents relative values for each point on the scanned part in comparison to CAD model.

Figure 40:
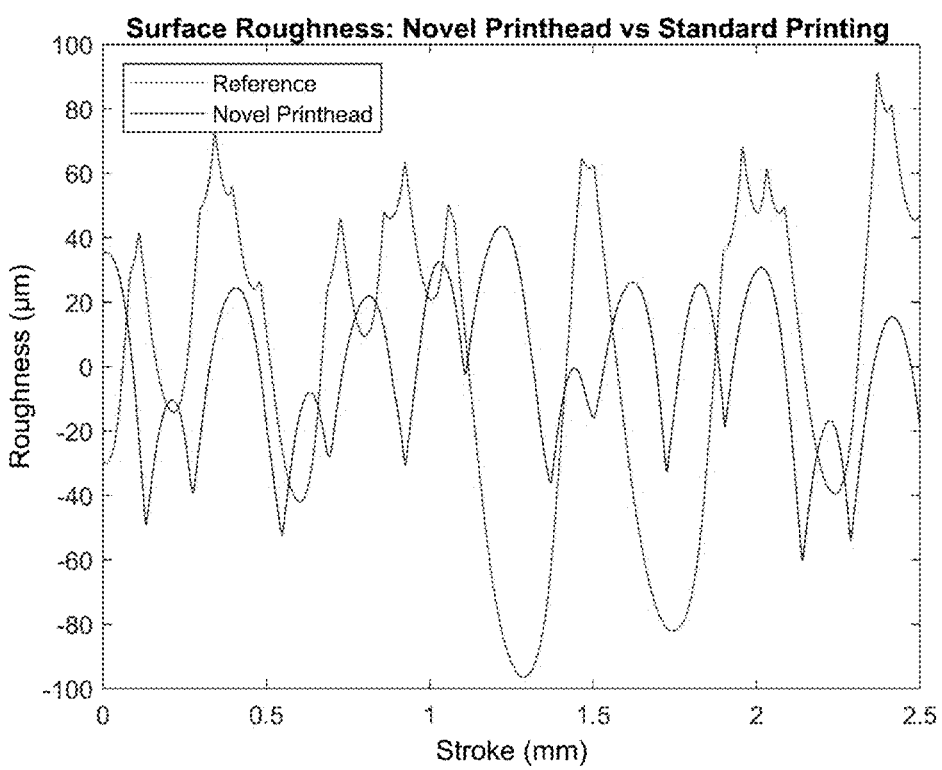
FIG. 40 shows a graph of the surface roughness of a novel print head vs a standard print head, according to one implementation.

Surface roughness results reveal that the novel print head is able to improve the surface finish of the parts by 20%. Surface roughness plays a major role in applications where fluid or air interacts with a part. An average surface roughness of the parts printed with a novel print head was 17.636 µm in comparison to standard printing which was 22.370 µm. Table 10 below shows experimental surface roughness values. Additionally, FIG. 40 shows a graph of the surface roughness of a novel print head vs a standard print head. The results show that the roughness of standard printing was higher than the novel print head samples, which is clearly visible in the graph here as the surface deviations of standard samples (red) overshadow the deviation for novel print head sample (blue).

TABLE 10

Surface roughness results for standard samples vs novel printhead samples.

| | Roughness, Ra (µm) | |
|---|---|---|
| Index | Standard Printing | Novel Printhead |
| 1 | 26.346 | 16.682 |
| 2 | 23.659 | 17.593 |
| 3 | 21.483 | 16.091 |
| 4 | 20.627 | 18.651 |
| 5 | 19.737 | 19.159 |
| Average | 22.370 | 17.636 |

Mechanical Testing Results

Figure 41:
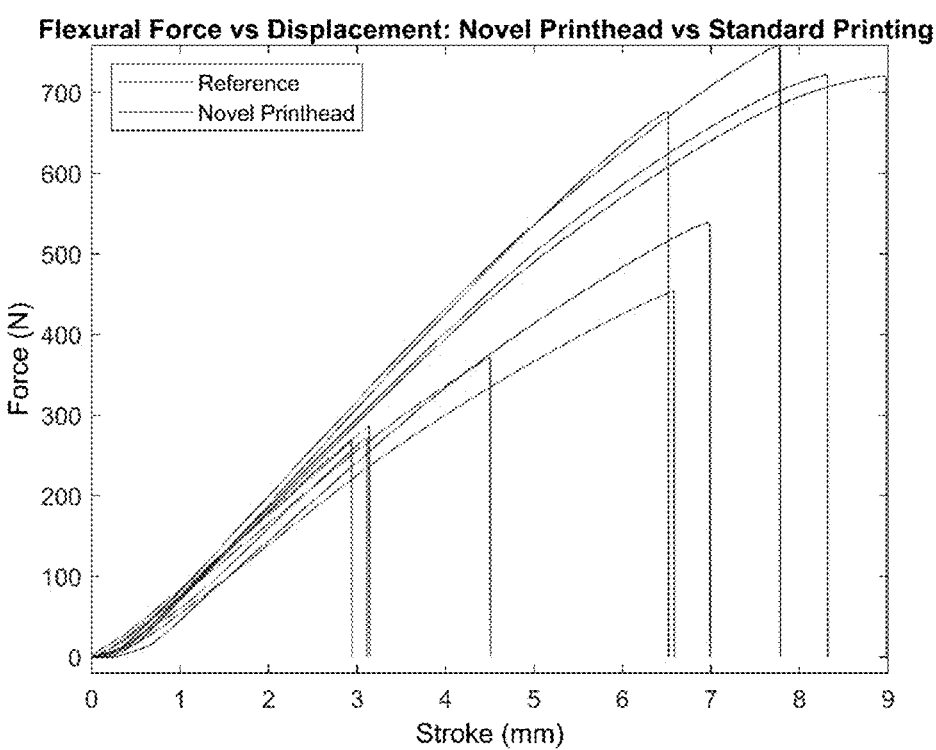
FIG. 41 depicts a graph of flexural strength for novel vs standard printheads, according to one implementation.

Five samples were tested from standard printing to evaluate maximum stress, strain, maximum deflection, and flexural modules. Results are shown in Table 11 below. Additionally, five were tested from novel print-head printing to evaluate maximum stress, strain, maximum deflection, and flexural modulus. Results are shown in Table 12 below. From Table 11 to Table 12, the results indicate that the parts printed with the novel print head have twice the strength in the Z-direction—results shown in FIG. 41 which depicts a graph of flexural strength for novel vs standard printheads.

TABLE 11

Five samples were tested from standard printing to evaluate maximum stress, strain, maximum deflection and flexural modulus.

| Index | Max displacement (mm) | Max stress (Mpa) | Flex Modulus (Mpa) | Max strain |
|---|---|---|---|---|
| 1 | 0.12377 | 11.94 | 16602.53 | 0.00072 |
| 2 | 0.12271 | 11.84 | 14870.27 | 0.00080 |
| 3 | 0.11588 | 12.31 | 13712.05 | 0.00090 |
| 4 | 0.1775 | 19.99 | 11684.68 | 0.00171 |
| 5 | 0.25932 | 22.48 | 10197.82 | 0.00220 |
| Average | 0.159836 | 15.71 | 13413.47 | 0.00127 |
| Standard Deviation | 0.0497 | 4.18 | 2070.05 | 0.00054 |

TABLE 12

Five samples were tested from novel print-head printing to evaluate maximum stress, strain, maximum deflection and flexural modulus.

| Index | Max displacement (mm) | Max stress (Mpa) | Flex Modulus (Mpa) | Max strain |
|---|---|---|---|---|
| 1 | 0.25672 | 31.47 | 43881.06 | 0.00072 |
| 2 | 0.30638 | 39.04 | 48655.49 | 0.00080 |
| 3 | 0.32761 | 34.67 | 51832.60 | 0.00067 |
| 4 | 0.35356 | 34.43 | 53494.48 | 0.00064 |
| 5 | 0.27527 | 30.01 | 29971.86 | 0.00100 |
| Average | 0.303908 | 33.92 | 45567.10 | 0.00077 |
| Standard deviation | 0.031833 | 2.84 | 7721.10 | 0.00012 |

Conclusions of Example 2

The results indicate that the tall, thin-walled structures, which are larger than the dog bone structures, can also benefit from the novel print head. The overall comparison between standard and novel printing is shown in Table 13 below.

TABLE 13

Overall comparison between standard printing and novel print head printing for structures similar to functional parts.

| Property | Novel printhead | Standard |
|---|---|---|
| Length deviation, absolute (mm) | 0.917 | 0.230 |
| Width deviation, absolute (mm) | 0.157 | 0.560 |
| Thickness deviation, absolute (mm) | 0.176 | 0.292 |
| Surface roughness, Ra (µm) | 17.636 | 22.370 |
| Strength (MPa) | 33.92 | 15.71 |
| Max displacement (mm) | 0.304 | 0.160 |

Specific Embodiments

In one aspect, a fused filament fabrication print head system is disclosed, the system including: a nozzle, the nozzle defines a nozzle opening and a filament flow path and is configured to deposit a filament through the nozzle opening; a heating block coupled to the nozzle such that the filament flow path extends through the heating block, the heating block including a heating element; and a cooling element spaced apart from the heating block along the filament flow path, the cooling element being configured to provide localized cooling to a portion of the filament at a location along the filament flow path prior to the heating block; wherein the localized cooling provided by the cooling element preserves the stiffness of the filament and ensures sufficient back pressure to push the filament through the heating block and the nozzle opening.

In some implementations, the nozzle and the heating block are integrally formed.

In some implementations, the nozzle is removably couplable to the heating block.

In some implementations, the heating block further includes a plate adjacent the nozzle.

In some implementations, the nozzle and the plate are integrally formed.

In some implementations, the plate is circular.

In some implementations, the plate has a diameter in a range of 10 mm to 610 mm.

In some implementations, the plate has a diameter of 100 mm.

In some implementations, the plate has a thickness in a range of 1 mm to 100 mm.

In some implementations, the plate has a thickness of 2 mm.

In some implementations, the plate has a thickness of 5 mm.

In some implementations, the plate has a thickness of 10 mm.

In some implementations, the plate includes a thermally conductive material.

In some implementations, the plate includes brass, stainless steel, hardened steel, bronze, copper, aluminum, tungsten, or any alloy thereof.

In some implementations, the plate includes a vapor chamber.

In some implementations, the system further includes a plurality of fins, the plurality of fins being disposed around the portion of the filament flow path that receives localized cooling from the cooling element.

In some implementations, the cooling element includes a fan.

In some implementations, the cooling element further includes a duct, and wherein the duct is coupled to the fan such that the fan is spaced apart from the filament flow path.

In some implementations, the duct includes a first portion that extends perpendicular to the portion of the filament flow path that receives localized cooling from the cooling element.

In some implementations, the duct further includes a second portion that extends from the first portion at an angle between 0 and 90 degrees.

In some implementations, the angle is 30 degrees.

In some implementations, the system further includes a throat, the throat being disposed at least around the portion of the filament that is receives localized cooling from the cooling element.

In some implementations, the throat includes a metal.

In some implementations, the throat includes a non-metal or insulator material.

In some implementations, the throat includes ceramic.

In some implementations, the throat extends from the location of the portion of the filament that is receiving localized cooling from the cooling element to the heating block.

In some implementations, the heating element includes a heating liquefier.

In some implementations, heating block further includes a thermocouple.

In some implementations, the nozzle includes a first end and a second end, the first end being adjacent the heating block, and the second end being spaced away from the heating block, and wherein a distance from the second end of the nozzle to the heating block ranges from 0.5 mm to 2.5 mm.

In some implementations, the distance from the second end of the nozzle to the heating block is 1 mm.

In some implementations, the distance from the second end of the nozzle to the heating block is 1.5 mm.

In some implementations, the distance from the second end of the nozzle to the heating block is 2 mm.

In some implementations, the system further includes a Teflon tube extending along a portion of the filament flow path adjacent the portion of the filament flow path that receives localized cooling from the cooling element.

In some implementations, the heating element is disposed within the heating block such that the heating element is spaced away from the filament flow path.

In some implementations, the system further includes an insulator disposed on top of the plate.

In another aspect, a fused filament fabrication print head system is disclosed, the system including: a nozzle that defines a nozzle opening, the nozzle being configured to deposit a filament through the nozzle opening; a heating block coupled to the nozzle, the heating block including a heating element; and a cooling element; and a filament flow path, the filament flow path extending through the cooling element, to the heating block, through the nozzle, and out the nozzle opening; wherein the cooling element is spaced apart from the heating block prior to the heating block along the filament flow path, wherein a portion of the filament flow path that extends through the cooling element receives localized cooling from the cooling element, and wherein the localized cooling provided by the cooling element preserves the stiffness of the filament and ensures sufficient back pressure to push the filament through the heating block and the nozzle opening.

In some implementations, the nozzle and the heating block are integrally formed.

In some implementations, the nozzle is removably couplable to the heating block.

In some implementations, the heating block further includes a plate adjacent the nozzle.

In some implementations, the nozzle and the plate are integrally formed.

In some implementations, the plate is circular.

In some implementations, the plate has a diameter in a range of 10 mm to 610 mm.

In some implementations, the plate has a diameter of 100 mm.

In some implementations, the plate has a thickness in a range of 1 mm to 100 mm.

In some implementations the plate has a thickness of 2 mm.

In some implementations, the plate has a thickness of 5 mm.

In some implementations the plate has a thickness of 10 mm.

In some implementations, the plate includes a thermally conductive material.

In some implementations, the plate includes brass, stainless steel, hardened steel, bronze, copper, aluminum, tungsten, or any alloy thereof.

In some implementations, the plate includes a vapor chamber.

In some implementations, the system further includes a plurality of fins, the plurality of fins being disposed around the portion of the filament flow path that receives localized cooling from the cooling element.

In some implementations, the cooling element includes a fan.

In some implementations, the cooling element further includes a duct, and wherein the duct is coupled to the fan such that the fan is spaced apart from the filament flow path.

In some implementations, the duct includes a first portion that extends perpendicular to the portion of the filament flow path that receives localized cooling from the cooling element.

In some implementations, the duct further includes a second portion that extends from the first portion at an angle between 0 and 90 degrees.

In some implementations, the angle is 30 degrees.

In some implementations, the system further includes a throat, the throat being disposed at least around the portion of the filament that is receives localized cooling from the cooling element.

In some implementations, the throat includes a metal.

In some implementations, the throat includes a non-metal or insulator material.

In some implementations, the throat includes ceramic.

In some implementations, the throat extends from a location of the portion of the filament that is receiving localized cooling from the cooling element to the heating block.

In some implementations, the heating element includes a heating liquefier.

In some implementations, the heating block further includes a thermocouple.

In some implementations, the nozzle includes a first end and a second end, the first end being adjacent the heating block, and the second end being spaced away from the heating block, and wherein a distance from the second end of the nozzle to the heating block ranges from 0.5 mm to 2.5 mm.

In some implementations, the distance from the second end of the nozzle to the heating block is 1 mm.

In some implementations, the distance from the second end of the nozzle to the heating block is 1.5 mm.

In some implementations, the distance from the second end of the nozzle to the heating block is 2 mm.

In some implementations, the system further includes a Teflon tube extending along a portion of the filament flow path adjacent the portion of the filament flow path that receives localized cooling from the cooling element.

In some implementations, the heating element is disposed within the heating block such that the heating element is spaced away from the filament flow path.

In some implementations, a ratio of plate thickness to diameter is from 0.01 to 1.

In some implementations, a plate is optimized for thermal performance and mass reduction.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," and "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A fused filament fabrication print head system, the system comprising:
   a nozzle, the nozzle defines a nozzle opening and a filament flow path and is configured to deposit a filament through the nozzle opening;
   a heating block coupled to the nozzle such that the filament flow path extends through the heating block, the heating block comprising a heating element; and
   a cooling element spaced apart from the heating block along the filament flow path, the cooling element being configured to provide localized cooling to a portion of the filament at a location along the filament flow path prior to the heating block, the cooling element comprising a plurality of fins, the plurality of fins being disposed around the portion of the filament flow path that receives localized cooling from the cooling element, a fan, and a duct;
   wherein the localized cooling provided by the cooling element preserves the stiffness of the filament and ensures sufficient back pressure to push the filament through the heating block and the nozzle opening, wherein the heating block further comprises a plate adjacent the nozzle, wherein the nozzle comprises a first end and a second end, the first end being adjacent the heating block, and the second end being spaced away from the heating block, and wherein a distance from the second end of the nozzle to the heating block ranges from 0.5 mm to 2.5 mm, wherein the plate is circular, and wherein the plate has a diameter in a range of 10 mm to 610 mm and a thickness in a range of 1 mm to 100 mm, and a ratio of plate thickness to diameter is from 0.01 to 1.

2. The system of claim 1, wherein the nozzle and the heating block are integrally formed.

3. The system of claim 1, wherein the nozzle is removably couplable to the heating block.

4. The system of claim 1,
wherein the duct is coupled to the fan such that the fan is spaced apart from the filament flow path.

5. The system of claim 4, wherein the duct comprises a first portion that extends perpendicular to the portion of the filament flow path that receives localized cooling from the cooling element,
wherein the duct further comprises a second portion that extends from the first portion at an angle between 0 and 90 degrees.

6. The system of claim 1, further comprising a throat, the throat being disposed at least around the portion of the filament that receives localized cooling from the cooling element,
wherein the throat extends from the location of the portion of the filament that is receiving localized cooling from the cooling element to the heating block.

7. The system of claim 1, wherein the heating block further comprises a thermocouple.

8. The system of claim 1, further comprising an insulator disposed on top of the plate.

9. A fused filament fabrication print head system, the system comprising:
a nozzle that defines a nozzle opening, the nozzle being configured to deposit a filament through the nozzle opening;
a heating block coupled to the nozzle, the heating block comprising a heating element;
a cooling element comprising a plurality of fins, the plurality of fins being disposed around a portion of the filament flow path that receives localized cooling from the cooling element, a fan, and a duct; and
a filament flow path, the filament flow path extending through the cooling element, to the heating block, through the nozzle, and out the nozzle opening;
wherein the cooling element is spaced apart from the heating block prior to the heating block along the filament flow path,
wherein a portion of the filament flow path that extends through the cooling element receives localized cooling from the cooling element, and
wherein the localized cooling provided by the cooling element preserves the stiffness of the filament and ensures sufficient back pressure to push the filament through the heating block and the nozzle opening,
wherein the heating block further comprises a plate adjacent the nozzle, wherein the nozzle comprises a first end and a second end, the first end being adjacent the heating block, and the second end being spaced away from the heating block, and wherein a distance from the second end of the nozzle to the heating block ranges from 0.5 mm to 2.5 mm, wherein the plate is circular, and wherein the plate has a diameter in a range of 10 mm to 610 mm and a thickness in a range of 1 mm to 100 mm, and a ratio of plate thickness to diameter is from 0.01 to 1.

10. The system of claim 9, wherein the nozzle and the plate are integrally formed.

11. The system of claim 9, wherein the plate is optimized for thermal performance and mass reduction.

12. The system of claim 9, wherein the plate comprises a vapor chamber.

13. The system of claim 9, further comprising a Teflon tube extending along a portion of the filament flow path adjacent the portion of the filament flow path that receives localized cooling from the cooling element.

14. The system of claim 9, wherein the heating element is disposed within the heating block such that the heating element is spaced away from the filament flow path.

* * * * *